US008672742B2

(12) United States Patent
Hedrick et al.

(10) Patent No.: US 8,672,742 B2
(45) Date of Patent: Mar. 18, 2014

(54) MERCHANDISING AND GAMING METHOD AND SYSTEM

(75) Inventors: Joseph R. Hedrick, Reno, NV (US); Binh T. Nguyen, Reno, NV (US)

(73) Assignee: IGT, Las Vegas, NV (US)

( * ) Notice: Subject to any disclaimer, the term of this patent is extended or adjusted under 35 U.S.C. 154(b) by 2137 days.

(21) Appl. No.: 10/933,944

(22) Filed: Sep. 3, 2004

(65) Prior Publication Data

US 2006/0052150 A1 Mar. 9, 2006

(51) Int. Cl.
*A63F 13/00* (2006.01)
*A63F 9/24* (2006.01)

(52) U.S. Cl.
USPC .................................. 463/25; 463/20; 463/21

(58) Field of Classification Search
USPC ...................................................... 463/16, 25
See application file for complete search history.

(56) References Cited

U.S. PATENT DOCUMENTS

| | | | |
|---|---|---|---|
| 4,695,053 A | 9/1987 | Vazquez et al. | |
| 4,764,666 A | 8/1988 | Bergeron | |
| 4,882,473 A | 11/1989 | Bergeron et al. | |
| 5,276,312 A | 1/1994 | McCarthy | |
| 5,332,076 A | 7/1994 | Ziegert | |
| 5,344,144 A | 9/1994 | Canon | |
| 5,371,345 A | 12/1994 | LeStrange et al. | |
| 5,397,125 A | 3/1995 | Adams | |
| 5,551,692 A | 9/1996 | Pettit et al. | |
| 5,580,309 A | 12/1996 | Piechowiak et al. | |
| 5,816,918 A * | 10/1998 | Kelly et al. ..................... | 463/16 |
| 5,836,817 A | 11/1998 | Acres et al. | |
| 5,882,262 A | 3/1999 | Ballhorn | |
| 5,935,000 A | 8/1999 | Sanchez, III et al. | |
| 6,007,426 A | 12/1999 | Kelly et al. | |
| 6,014,594 A | 1/2000 | Heidel et al. | |
| 6,015,344 A | 1/2000 | Kelly et al. | |
| 6,039,648 A | 3/2000 | Guinn et al. | |
| 6,062,980 A | 5/2000 | Luciano | |
| 6,068,553 A | 5/2000 | Parker | |
| 6,110,041 A | 8/2000 | Walker et al. | |
| 6,113,098 A | 9/2000 | Adams | |

(Continued)

FOREIGN PATENT DOCUMENTS

WO WO 01/64306 9/2001

OTHER PUBLICATIONS

Raining Diamonds Advertisement published by Sierra Design Group in 2001.

(Continued)

*Primary Examiner* — Melba Bumgarner
*Assistant Examiner* — Marcus Jones
(74) *Attorney, Agent, or Firm* — Neal, Gerber & Eisenberg LLP

(57) ABSTRACT

A gaming method includes receiving a wager from a player in terms of one or more credits, displaying an image representative of a game, and determining an outcome associated with the game. The method further includes determining if an event has occurred, calculating a purchase cost for each payout in a plurality of payouts when the event occurs, displaying an image representing the plurality of payouts, the image including the payout cost for each payout in the plurality of payouts, receiving a selection from the player of one of the plurality of payouts, receiving from the player the purchase cost of the one of the plurality of payouts selected by the player, and transmitting a request to provide the one of the plurality of payouts to the player.

21 Claims, 17 Drawing Sheets

(56) References Cited

U.S. PATENT DOCUMENTS

| | | | |
|---|---|---|---|
| 6,113,495 | A | 9/2000 | Walker et al. |
| 6,186,893 | B1 | 2/2001 | Walker et al. |
| 6,186,894 | B1 | 2/2001 | Mayeroff |
| 6,224,483 | B1 | 5/2001 | Mayeroff |
| 6,231,442 | B1 | 5/2001 | Mayeroff |
| 6,306,035 | B1 | 10/2001 | Kelly et al. |
| 6,491,584 | B2 | 12/2002 | Graham et al. |
| 6,572,471 | B1 | 6/2003 | Bennett |
| 6,579,179 | B2 | 6/2003 | Poole et al. |
| 6,609,969 | B1 | 8/2003 | Luciano et al. |
| 6,609,970 | B1 | 8/2003 | Luciano |
| 6,609,978 | B1 | 8/2003 | Paulsen |
| 6,623,357 | B2 | 9/2003 | Chowdhury |
| 6,843,720 | B2 | 1/2005 | Luciano et al. |
| 8,070,598 | B1 * | 12/2011 | Guinn et al. .................... 463/29 |
| 2003/0060264 | A1 | 3/2003 | Chilton et al. |
| 2005/0043082 | A1 | 2/2005 | Peterson et al. |
| 2006/0063580 | A1 | 3/2006 | Nguyen et al. |
| 2007/0167218 | A1 * | 7/2007 | Rothschild et al. ............. 463/25 |

OTHER PUBLICATIONS

Gold Exchange Advertisement published by Sierra Design Group prior to Aug. 2003.

* cited by examiner

MERCHANDISING AND GAMING METHOD AND SYSTEM

BACKGROUND

This patent is directed to a gaming method and system, and in particular to a merchandising and gaming method and system.

SUMMARY OF THE INVENTION

In one aspect, a gaming method includes receiving a wager from a player in terms of one or more credits, displaying an image representative of a game, and determining an outcome associated with the game. The method further includes determining if an event has occurred, calculating a purchase cost for each payout in a plurality of payouts when the event occurs, displaying an image representing the plurality of payouts, the image including the payout cost for each payout in the plurality of payouts, receiving a selection from the player of one of the plurality of payouts, receiving from the player the purchase cost of the one of the plurality of payouts selected by the player, and transmitting a request to provide the one of the plurality of payouts to the player.

In another aspect, a gaming system includes a gaming apparatus and a merchandising computer. The gaming apparatus includes a value input device, a display unit, and a controller having a processor and a memory operatively coupled to the processor, the controller operatively coupled to the value input device and the display unit. The controller is programmed to receive a wager from a player in terms of one or more credits, to cause the display unit to generate an image representative of a game, and to determine an outcome associated with the game. The merchandising computer includes a processor and memory operatively coupled to the processor. The merchandising computer is programmed to determine if an event has occurred, to calculate a purchase cost for each payout in a plurality of payouts when the event occurs, to cause the display unit to generate an image representing the plurality of payouts, the image including the payout cost for each payout in the plurality of payouts, to receive a selection from the player of one of the plurality of payouts, to receive from the player the purchase cost of the one of the plurality of payouts selected by the player, and to transmit a request to provide the one of the plurality of payouts to the player.

Additional aspects of the disclosure are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
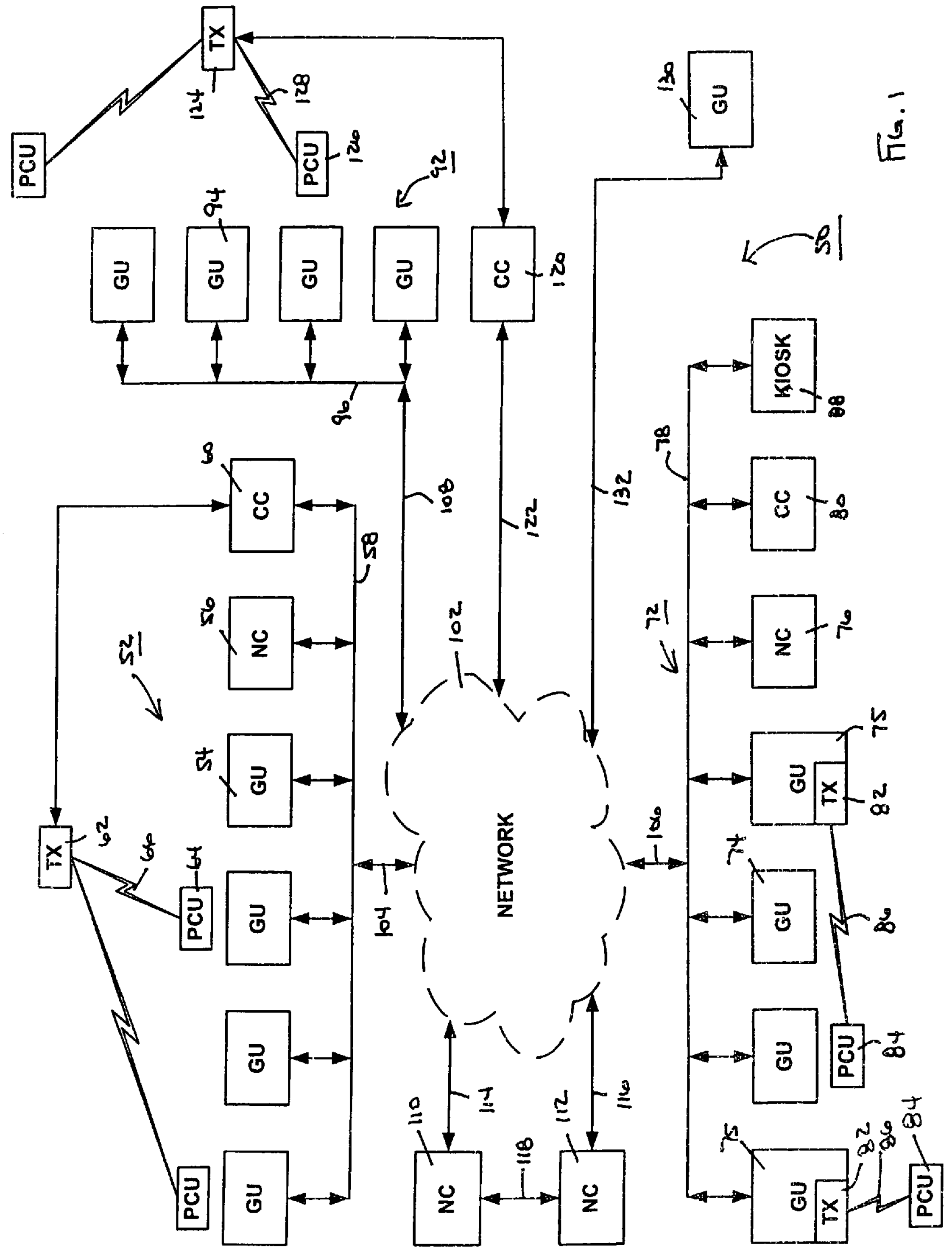
FIG. 1 is a block diagram of an embodiment of a merchandising and gaming system in accordance with the disclosure.

FIG. 1 illustrates one possible embodiment of a casino gaming system 50 (hereinafter "system 50") in accordance with the disclosure. Referring to FIG. 1, the system 50 may include a first group or network 52 of casino gaming units 54 operatively coupled to a network computer 56 via a network data link or a bus 58. The first network 52 may also include a communications computer 60, which may be coupled to the network computer 56 via the data link or bus 58. The communications computer 60 may also be coupled to a transceiver 62, which transceiver may be a wireless transceiver, such as a radio frequency transceiver or infrared transceiver, for example. The transceiver 62 may be in communication with one or more personal communication units 64 (such as a Personal Digital Assistant or the like, having a controller including a processor and memory operatively coupled to the processor), a data link 66 being formed according to the method of communication used (e.g., radio frequency, infrared, etc.). The personal communication units 64 may be owned by the player, or may be provided to the player by the operator of the network 52.

The system 50 may include a second group or network 72 of casino gaming units 74, 75 operatively coupled to a network computer 76 via a network data link or a bus 78. The second network 72 may also include a communications computer 80, which may be coupled to the network computer 76 via the data link or bus 78. The communications computer 80 may also be coupled via the data link or bus 78 to transceivers 82 that are attached to or integrated with the gaming units 75, which transceivers may be wireless transceivers, such as a radio frequency transceivers or infrared transceivers, for example. The transceivers 82 may be in communication with one or more personal communication units 84, a data link 86 being formed according to the method of communication used (e.g., radio frequency, infrared, etc.). The personal communication units 84 may be owned by the player, or may be provided to the player by the operator of the network 72.

The system 50 may further include a third group or network 92 of casino gaming units 94. The gaming units 94 may be coupled via a data link or a bus 96. The third network 92 differs from the first and second networks in that there is no network computer coupled to the data link 96.

The first, second, and third gaming networks 52, 72, 92 may be operatively coupled to each other via a fourth network 102, which may comprise, for example, the Internet, an intranet, a wide area network (WAN), or a local area network (LAN). The network 102 may include a plurality of network computers or server computers (not shown), each of which may be operatively interconnected, and may include Internet Service Providers (ISPs) or online service providers. The first, second and third networks 52, 72, 92 may be coupled to the fourth network 102 via a first, second, and third data links 104, 106, 108. Where the network 102 comprises an Intranet or the Internet, data communication may take place over the communication links 104, 106, 108 via an Internet communication protocol.

The fourth network may also be coupled to other computers or networks other than the first, second and third networks 52, 72, 92 discussed above. For example, the fourth network may be coupled to one or more other network computers 110, 112, via data links 114, 116. These network computers may, in turn, be coupled via data links 118. Additionally, the fourth network may be coupled to a communications computer 120 via a data link 122, the communications computer being coupled to a transceiver 124. The transceiver 124 is shown in communication with personal communication units 126, which may be in the same geographic location as the gaming units 94 of the network 92 via a data link 128 formed according to the method of communication used (e.g. radio frequency, infrared, etc.). The personal communication units 126 may be owned by the player, or may be provided to the player by the operator of the network 92. Also shown coupled to the network 102 is a gaming unit 130; the network 102 may be coupled to the gaming unit 130 by a data link 132.

The network computer 56 may be a server. According to one embodiment, the network computer 56 may be used as an accounting system server to accumulate and analyze data relating to the operation of the gaming units 54. For example, the network computer 56 may continuously receive data from each of the gaming units 54 indicative of the dollar amount and number of wagers being made on each of the gaming units 54, data indicative of how much each of the gaming units 54 is paying out in winnings, etc. According to another embodiment, the network computer 56 may be used as a player tracking server or a bonusing server to accumulate and analyze data relating to the operation of particular gaming units 54. According to this embodiment, the network computer 56 may receive data from a particular gaming unit 54 indicative of the identity of the player operating the gaming unit 54, the number of wagers being made on the gaming unit 54, etc. If the network computer 56 is being used as a player tracking server, the network computer 56 may use the data accumulated to award player tracking points to the player, which points may be used to assess comps or to be redeemed for goods or services. If the network computer is being used as a bonusing computer, the network computer 56 may use the data accumulated to award the player prizes, which may be goods or services, based on individual or collective performance, to award bonusing points which points may be redeemed for goods or services, etc. According to a still further embodiment, the network computer 56 may be used as a download server to monitor the software implemented by and the data utilized by the gaming units 54, to determine if software or data upgrades are available, and to download the upgrades to the gaming units 54.

The network computer 76 may be a server and may be used to perform the same or different functions in relation to the gaming units 74, 75 as the network computer 56 described above. Similarly, the network computers 110, 112 may be servers, and may be used to perform the same or different functions in relation to the gaming units 54, 74, 75, 94 as the network computers 56, 76. Moreover, the network computers 110, 112 may be different servers, and may perform the same or different functions in relation to the gaming units 54, 74, 75, 94.

As an alternative, the operation of the gaming units may be monitored and/or coordinated without the use of a central computer or controller, as in the third network 92. During operation, the processing required by the operations otherwise performed by a network computer may be shared by the gaming units 94. Such shared processing may be referred to as peer-to-peer networking, and is also within the scope of the present disclosure.

The communications computers 60, 80 may also be servers. That is, the computers 60, 80 may monitor and coordinate the communications between other computers, such as the network computers 56, 76, and the personal communication devices 64, 84 via the transceivers 62, 82. Alternatively, as in the case of the communications computer 120, the communications computer may be part of a mobile communications network that is operated and administered by an entity other than the entity that operates and administers the network of gaming units, such as gaming units 94. Such a mobile communications network may be a cellular telephone network, and the communications computer 120 may represent the base station system of such a network, which base station system may be in communication with the Internet via a gateway, for example. According to this embodiment, the personal communication units 126 may be mobile stations, such as cellular telephones, portable e-mail devices (e.g. BLACKBERRY® devices manufactured by Research In Motion Ltd., of Waterloo, Ontario, Canada), personal digital assistants (PDA), laptops, tablet personal computers, etc.

The first network 52 of gaming units 54 may be provided in a first casino, the second network 72 of gaming units 74 may be provided in a second casino located in a separate geographic location than the first casino, and the third network 92 of gaming units 94 may be provided in a third casino in a separate geographic location that the first and the second networks. For example, the three casinos may be located in different areas of the same city, or they may be located in different states. However, the three networks 52, 72, 92 may be disposed in different sections of the same casino, or the gaming units 54, 74, 75, and 94 may even be disposed in the same section of the same casino.

Although the networks 52, 72 are shown as including one network computer 56, 76, one communications computer 60, 80, and four gaming units 54, 64 and the network 92 as including four gaming units 94, it should be understood that different numbers of computers and gaming units may be utilized. For example, the network 52 may include a plurality of network computers 56 and tens or hundreds of gaming units 54, all of which may be interconnected via the data link 58. The data link 58 may be provided as a dedicated hardwired link, a wireless link, a fiber optic link, or a network (LAN, WAN, Internet, intranet) connection. Although the data link 58 is shown as a single data link 58, the data link 58 may comprise multiple data links. Numerous gaming units 130, kiosks 88, personal communication units 64, 84, 126 may also be included.

Figure 2:
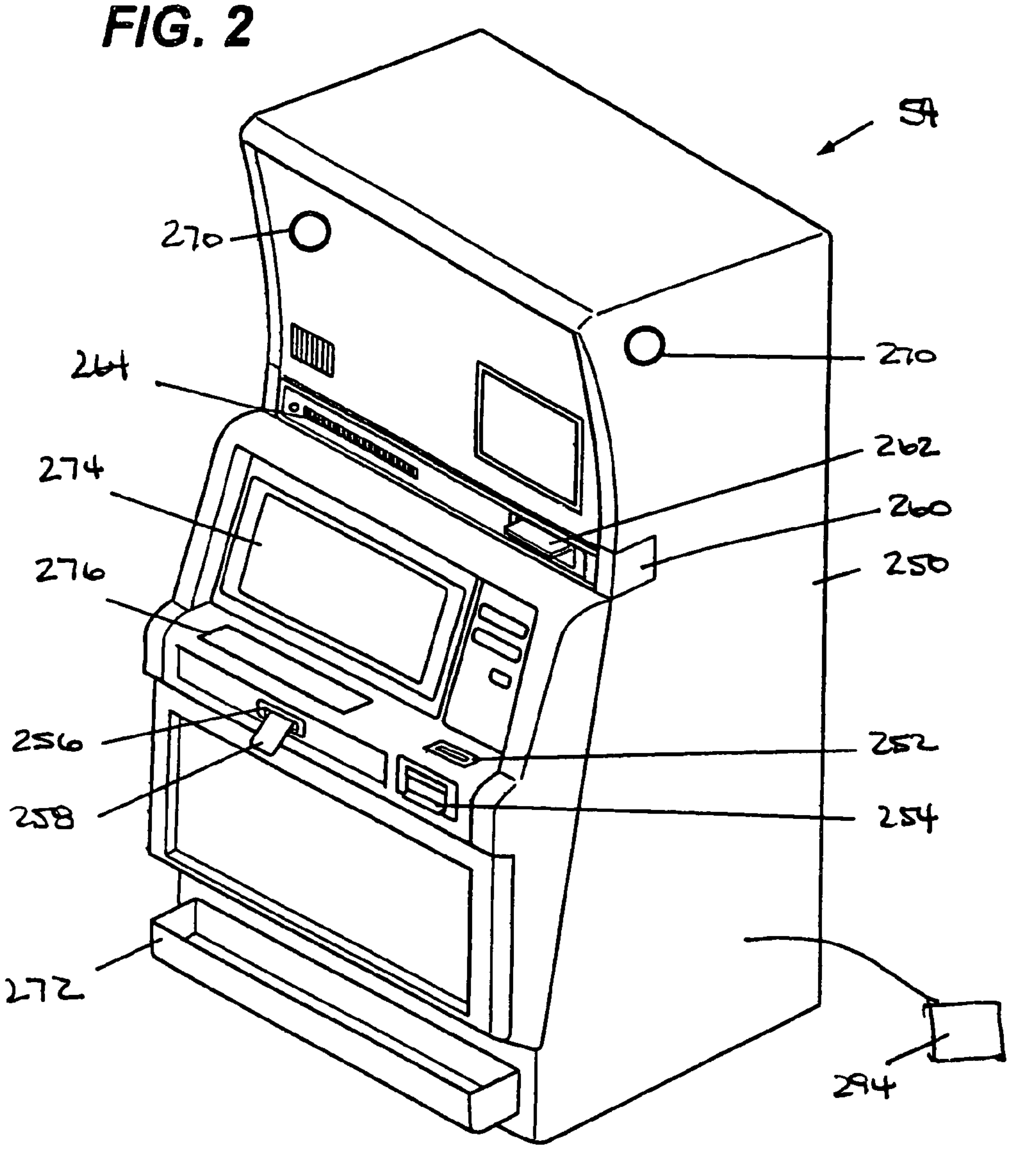
FIG. 2 is a perspective view of an embodiment of one of the gaming units shown schematically in FIG. 1.

FIG. 2 is a perspective view of one possible embodiment of one or more of the gaming units 54. Although the following description addresses the design of the gaming units 54, it should be understood that the gaming units 74, 75, 94 may have the same design as the gaming units 54 described below. It should be understood that the design of one or more of the gaming units 54 may be different than the design of other gaming units 54, and that the design of one or more of the gaming units 74, 75, 94 may be different than the design of other gaming units 74, 75, 94. Each gaming unit 54 may be any type of casino gaming unit and may have various different structures and methods of operation. For exemplary purposes, various designs of the gaming units 54 (and 75) are described below, but it should be understood that numerous other designs may be utilized.

Referring to FIG. 2, the casino gaming unit 54 may include a housing or cabinet 250 and one or more value input devices, which may include a coin slot or acceptor 252, a paper currency acceptor 254, and a ticket reader/printer 256. The value input device may also be a card reader (not shown). A value input device may include any device that can accept value from or transfer value for a player, and may be disposed on the front of the gaming unit 54 or in any other suitable location. As used herein, the term "value" may encompass money denominations or credits, and may be in the form of coins, paper currency, gaming tokens, ticket vouchers, credit or debit cards, smart cards, electronic funds transfers (EFT) and any other object representative of value.

Some of the value input devices may also operate as value output devices. For example, if provided on the gaming unit 54, the ticket reader/printer 256 may be used to print or otherwise encode ticket vouchers 258. The ticket vouchers 258 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 258 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 258 could be printed with an optically readable material such as ink, or data on the ticket vouchers 258 could be magnetically encoded. The ticket reader/printer 256 may be provided with the ability to both read and print ticket vouchers 258, or it may be provided with the ability to only read or only print or encode ticket vouchers 258. In the latter case, for example, some of the gaming units 54 may have ticket printers 256 that may be used to print ticket vouchers 258, which could then be used by a player in other gaming units 54 that have ticket readers 256.

As another alternative, an electronic funds transfer (EFT) device (not shown) may operate as both a value input device and a value output device. Such an EFT device may include a circuit capable of performing or a controller programmed to perform an electronic funds transfer (EFT) to the player's bank account or to a virtual account established, for example, on a PDA or at a casino. Such a transfer may be performed over a hardwired, wireless, fiber optic or network connection. As such a device is capable of transferring money to and from the gaming unit 54, it may operate either as a value input device or a value output device.

Also attached to the gaming unit 54 is a player tracking module 260. The player tracking module 260 includes a card reader 262 and a display 264. The card reader 262 may include any type of card reading device, such as a magnetic card reader or an optical card reader, and may be used to read data from a card offered by a player, such as a player tracking card. The card reader 262 may be used to read data from, and/or write data to, player tracking cards that are capable of storing data representing the identity of a player, the identity of a casino, the player's gaming habits, etc. The display 264 may be a vacuum fluorescent display (VFD), a liquid crystal display (LCD), an array of LED elements, etc. The display 264 may be used to display messages particular to the player tracking system, or may be controlled by the gaming unit 54 or other servers to display messages particular to the operation of the gaming unit 54 or other systems (such as, for example, bonusing messages from a bonusing system).

The gaming unit 54 may include one or more audio speakers 270, a coin payout tray 272, a display unit 274, and an input control panel 276. The audio speakers 270 may generate audio representing sounds such as the noise of spinning slot machine reels, a dealer's voice, music, announcements or any other audio related to a casino game. Where the gaming unit 54 is designed to facilitate play of a video casino game, such as video poker or video slots, the display unit 274 may be a color video display unit that displays images relating to the particular game or games. Where the gaming unit 54 is designed to facilitate play of a reel-type slot machine, the display unit 274 may comprise a plurality of mechanical reels that are rotatable, with each of the reels having a plurality of reel images disposed thereon. The input control panel 276 may be provided with a plurality of pushbuttons or touch-sensitive areas that may be pressed by a player to select games, make wagers, make gaming decisions, etc.

Figure 2A:
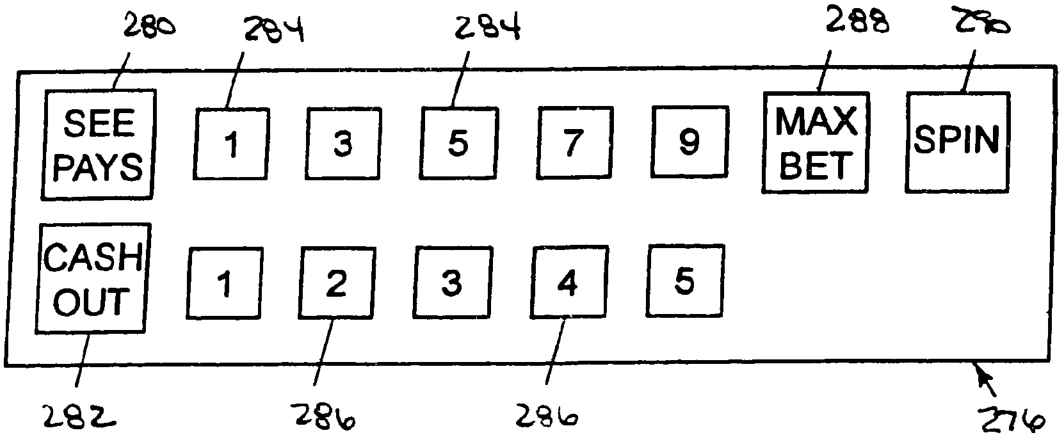
FIG. 2A illustrates an embodiment of a control panel for a gaming unit.

FIG. 2A illustrates one possible embodiment of the control panel 276, which may be used where the gaming unit 54 is a slot machine having a plurality of mechanical, electromechanical or electronic (i.e., as represented on a video display unit) reels. Referring to FIG. 2A, if the display unit 274 is provided in the form of a video display unit, the control panel 276 may include a "See Pays" button 280 that, when activated, causes the display unit 274 to generate one or more display screens showing the odds or payout information for the game or games provided by the gaming unit 54. As used herein, the term "button" is intended to encompass any device that allows a player to make an input, such as an input device that must be depressed to make an input selection or a display area that a player may simply touch. The control panel 276 may include a "Cash Out" button 282 that may be activated when a player decides to terminate play on the gaming unit 54, in which case the gaming unit 54 may return value to the player, such as by returning a number of coins to the player via the payout tray 272.

If the gaming unit 54 provides a slots game having a plurality of reels and a plurality of paylines which define winning combinations of reel symbols, the control panel 276 may be provided with a plurality of selection buttons 284, each of which allows the player to select a different number of paylines prior to spinning the reels. For example, five buttons 284 may be provided, each of which may allow a player to select one, three, five, seven or nine paylines.

If the gaming unit 54 provides a slots game having a plurality of reels, the control panel 276 may be provided with a plurality of selection buttons 286 each of which allows a player to specify a wager amount for each payline selected. For example, if the smallest wager accepted by the gaming unit 54 is a quarter ($0.25), the gaming unit 54 may be provided with five selection buttons 286, each of which may allow a player to select one, two, three, four or five quarters to wager for each payline selected; In that case, if a player were to activate the "5" button 284 (meaning that five paylines were to be played on the next spin of the reels) and then activate the "3" button 286 (meaning that three coins per payline were to be wagered), the total wager would be $3.75 (assuming the minimum bet was $0.25).

The control panel 276 may include a "Max Bet" button 288 to allow a player to make the maximum wager allowable for a game. In the above example, where up to nine paylines were provided and up to five quarters could be wagered for each payline selected, the maximum wager would be 45 quarters, or $11.25. The control panel 276 may include a spin button 290 to allow the player to initiate spinning the reels of a slots game after a wager has been made.

In FIG. 2A, a rectangle is shown around the buttons 280, 282, 284, 286, 288, 290. It should be understood that that rectangle simply designates, for ease of reference, an area in which the buttons 280, 282, 284, 286, 288, 290 may be located. Consequently, the term "control panel" should not be construed to imply that a panel or plate separate from the housing 250 of the gaming unit 54 is required, and the term "control panel" may encompass a plurality or grouping of player activatable buttons.

Although one possible control panel 276 is described above, it should be understood that different buttons could be utilized in the control panel 276, and that the particular buttons used may depend on the game or games that could be played on the gaming unit 54. If the display unit 274 is provided as a video display unit, the control panel 276 could be generated by the display unit 274. In that case, each of the buttons of the control panel 276 could be a colored area generated by the display unit 274, and some type of mechanism may be associated with the display unit 274 to detect when each of the buttons was touched, such as a touch-sensitive screen.

The gaming unit 54 may also include a mechanism 294 by which the gaming unit 54 may determine the identity of the player. This mechanism may be separate from the other elements of the gaming unit 54, may be incorporated into one of the other elements of the gaming unit 54, or its function may be provided by one of the other elements of the gaming unit 54. As an example of the latter category, the card reader 262 may be used to read a card that carries an identification code that may be uniquely associated with the player so that the gaming unit 54 can differentiate that player from all other players, or so that the gaming unit 54 can differentiate that player as a member of a group of players from all players not a member of the group of players. In FIG. 2, a separate identification device 294 is illustrated.

The identification device 294 may include equipment, such as a keypad, an input pad (with optional stylus), a port (or antenna) adapted to communicate via a wired or wireless link (infrared or radio frequency link, for example) to a Personal Digital Assistant (PDA), a camera, a scanner, a retinal (or iris) scanner, fingerprint scanner, and/or a microphone. The identification device 294 may include any one of these devices, or the identification device 294 may include a combination of some or all of these devices. Thus, utilizing the identification device 294, a player may identify him or herself by entering a unique numeric or alpha-numeric code using the key pad, for example. Alternatively, the player may use his or her finger or the stylus to sign his or her signature on the input pad. The pad and/or stylus may include instrumentation to record such characteristics as position, form, speed, and/or pressure as the player signs his or her signature. As a further alternative, the player may sign his or her signature on the Personal Digital Assistant, which signature is then converted to electronic data, and the data is then transferred via the port/antenna to the identification device 294. As yet another alternative, the player may sign his or her signature on a piece of paper that is then photographed using the camera or scanned using the scanner (or the bill acceptor 254) to convert the signature into electronic data. As an additional alternative, the player may place one of his or her fingers or his or her hand on the scanner, and the scanner may generate an electronic data representation of the fingerprint on one or more of the player's fingers or an electronic data representation of the pattern of the entire hand. Alternatively, the camera may be used to take a picture (live or still) of the player, the picture then being converted into electronic data. As a still further alternative, the player may place his or her eye up to the retinal (or iris) scanner, and the retinal (or iris) scanner may generate an electronic data representation corresponding to the pattern of the retina (or iris) of the player. As yet another alternative, the player may speak into the microphone, and characteristics of the spoken words (or voiceprint) may be converted into an electronic data representation.

Other equipment may also be used in conjunction with the identification device 294. For example, rather than using a stylus, a mouse or glove may be used. Additionally, thermal imaging equipment may be included or substituted. Moreover, a touchscreen may be integrated with the display unit 274 and used, in place of the input pad, in combination with a stylus or a finger, for example.

Gaming Unit Electronics

Figure 3:
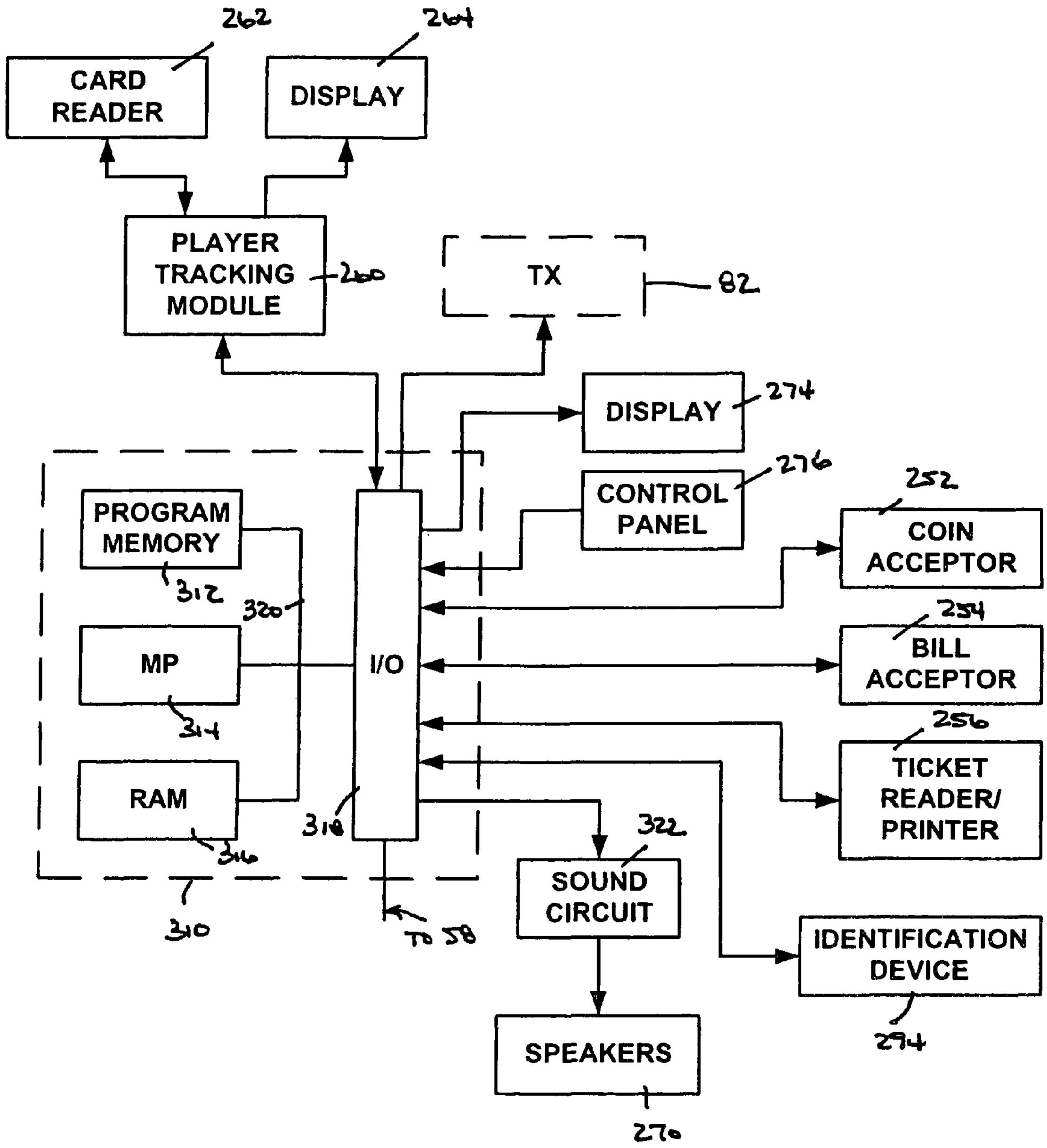
FIG. 3 is a block diagram of the electronic components of the gaming unit of FIG. 2.

FIG. 3 is a block diagram of a number of components that may be incorporated in the gaming unit 54. Referring to FIG. 3, the gaming unit 54 may include a controller 310 that may comprise a program memory 312, a microcontroller or microprocessor (MP) 314, a random-access memory (RAM) 316 and an input/output (I/O) circuit 318, all of which may be interconnected via an address/data bus 320. It should be appreciated that although only one microprocessor 314 is shown, the controller 310 may include multiple microprocessors 314. Similarly, the memory of the controller 310 may include multiple RAMs 316 and multiple program memories 312. Although the I/O circuit 318 is shown as a single block, it should be appreciated that the I/O circuit 318 may include a number of different types of I/O circuits. The RAM(s) 316 and program memories 312 may be implemented as semiconductor memories, magnetically readable memories, and/or optically readable memories, for example.

Although the program memory 312 is shown in FIG. 3 as a read-only memory (ROM) 312, the program memory of the controller 310 may be a read/write or alterable memory, such as a hard disk. In the event a hard disk is used as a program memory, the address/data bus 320 shown schematically in FIG. 3 may comprise multiple address/data buses, which may be of different types, and there may be an I/O circuit disposed between the address/data buses.

Furthermore, while the controller 310 is shown as a dashed box surrounding the memories 312, 316, processor 314, and I/O circuit 318, this should not be interpreted as a physical limitation on the controller 310. The memories 312, 316 and processor 314 may be disposed on a single board, or they may be disposed on separate boards. Similarly, the I/O circuit 318 may be disposed on the same board as the memories 312, 316 and processor 314, or may be disposed on a separate board.

FIG. 3 illustrates that the coin acceptor 252, the bill acceptor 254, the ticket reader/printer 256, the player tracking module 260, the display unit 274, the control panel 276, and the identification device 294 may be operatively coupled to the I/O circuit 318, each of those components being so coupled by either a unidirectional or bidirectional, single-line or multiple-line data link, which may depend on the design of the component that is used. The speaker(s) 270 may be operatively coupled to a sound circuit 322, that may comprise a voice- and sound-synthesis circuit or that may comprise a driver circuit. The sound-generating circuit 322 may be coupled to the I/O circuit 318. Additionally, for a gaming unit such as the gaming unit 75, the transceiver 82 may also be coupled to the I/O circuit 318.

As shown in FIG. 3, the components 252, 254, 256, 260, 274, 276, 294, 322 (and, optionally, 82) may be connected to the I/O circuit 318 via a respective direct line or conductor. Different connection schemes could be used. For example, one or more of the components shown in FIG. 3 may be connected to the I/O circuit 318 via a common bus or other data link that is shared by a number of components. Furthermore, some of the components may be directly connected to the microprocessor 314 without passing through the I/O circuit 318.

Figure 3A:
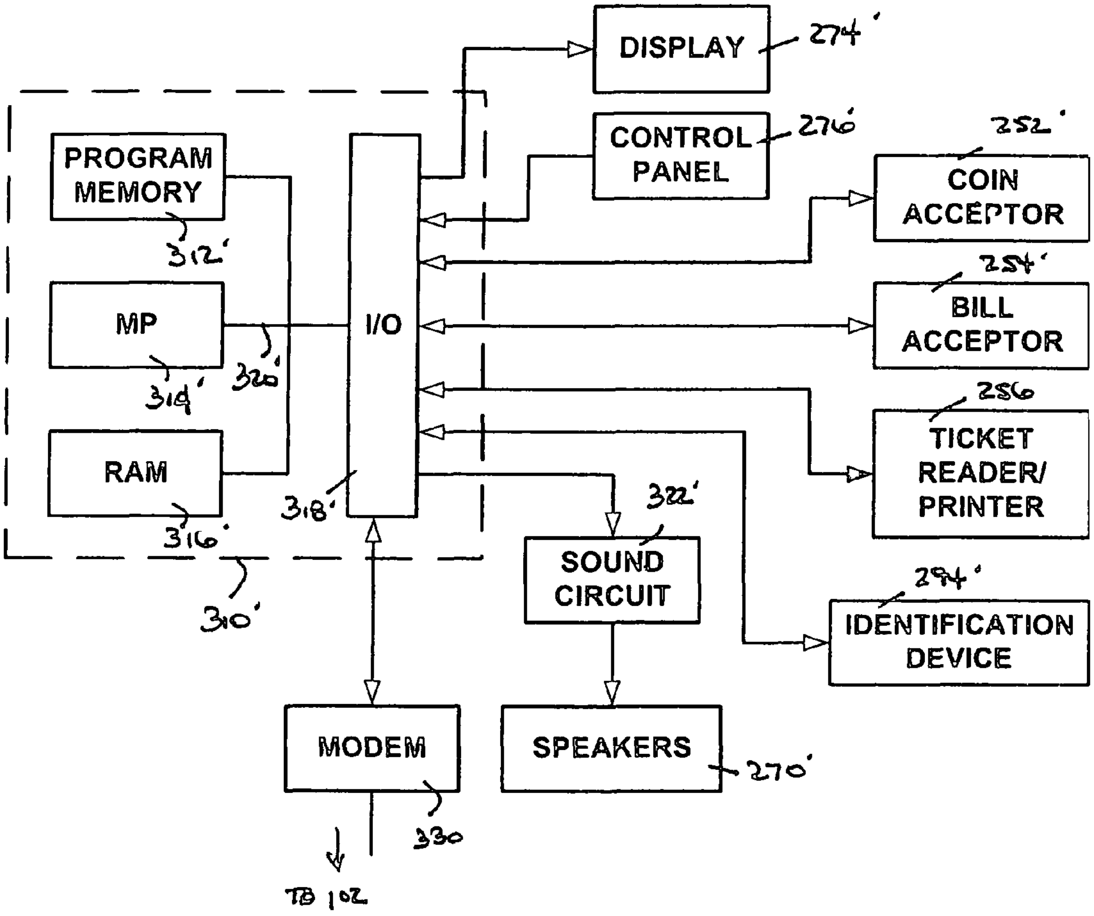
FIG. 3A is a block diagram of the electronic components of an alternative gaming unit to the gaming unit shown in FIG. 2.

FIG. 3A is a block diagram of a number of components that may be incorporated in an alternative gaming unit, such as the gaming unit 130 shown in FIG. 1. Elements similar to those in FIG. 3 are numbered similarly, with the distinction that the similar elements shown in FIG. 3A are denoted with a prime.

Similar to the gaming unit 54 shown in FIG. 3, the gaming unit 130 shown in FIG. 3A may include a controller 310' having program memory 312', microprocessor 314', and RAM 316'. Moreover, the program memory 312', microprocessor 314' and RAM 316' may be operatively coupled to an input/output circuit 318' via a data-link or a bus 320'. Further, the I/O circuit 318' may be coupled to a display 274' and a control panel 276', and to speakers 270' via a sound circuit 322'. While the I/O circuit 318' is shown coupled to wager input devices, such as a coin acceptor 252', a currency acceptor 254' and a ticket reader/printer 256', these elements may be optional according to an embodiment of the gaming unit 130 that envisions implementation of cashless gaming. An identification device 294' may also be coupled to the I/O circuit 318'.

The gaming unit 130 shown in FIG. 3A may differ from the gaming units 54, 74, 75, 94, which may be represented by the block diagram shown in FIG. 3, in that the gaming unit 130 may include a modem 330. As illustrated in FIG. 3A, the modem 330 is coupled to the I/O circuit 318 by a bidirectional link. As also illustrated in FIG. 3A, the modem 330 is coupled to the network 102 by the data link 132.

The modem 330 may be any well known device that modulates digital signals into analog signals, and that demodulates analog signals into digital signals. For example, the modem 330 may be one of a pair of a digital subscriber line ("DSL") modems disposed at opposite ends of a telephone line. Such a DSL modem may be an ADSL (Asymmetric Digital Subscriber Line) modem or a VDSL (very high bit-rate DSL) modem. As a further alternative, the modem 330 may be a cable modem. As yet another alternative, the modem 330 may be an Integrated Services Digital Network ("ISDN") modem or adapter.

In turn, the data link 132 may be selected to conform to the modem selected. Where the modem is a conventional modem, the data link may include a telephone line. Where the modem is a DSL modem (whether ADSL, VDSL, etc.), the data link 132 may include a telephone line and a second modem at the opposite end of the telephone line. With a cable modem, the data link 132 may be coaxial cable; in fact, a pre-existing coaxial TV cable installation may be used. An ISDN modem or adapter may also use a telephone line, but it further requires ISDN digital-switching equipment and an external power source.

Overall Operation of System

One manner in which the system 50 and one or more of the gaming units 54 (and one or more of the gaming units 74, 75, 94) may operate is described below in connection with a number of flowcharts which may be implemented as a number of portions or routines of one or more computer programs. These programs or portions of programs may be represented as a set of instructions that may be carried out by one or more of the network computers 56, 76, 110, 112 and/or the controller 310 of gaming units 54, 74, 75, 94, for example.

The programs or portions of programs may be written in any high level language such as C, C++, C#, Java, Visual Basic or the like, or any low-level assembly or machine language. The programs or portions of programs may include data files, binary files, scripts, data tables, graphic file formats, 3D models, etc. Furthermore, the programs or portions of programs may be implemented using an event-based triggering system. That is, the controller 310, for example, may generate an event (for example, in connection with a game outcome) that is in turn communicated to the display unit 274, the sound circuit 322, and a payout device, for example, the ticket reader/printer 256. Each unit or device may then determine if the communicated event has significance for that unit or device, and what that significance may be. As a result, units or device may be added or removed from the gaming unit 54 without requiring significant reprogramming of the controller 310, thereby permitting a modular approach to be implemented.

It will also be recognized that the programs or portions of programs may be stored on a machine accessible medium. A machine accessible medium includes any mechanism that provides (i.e., stores and/or transmits) information in a form accessible by a machine (e.g., a computer, network device, personal digital assistant, any device with a set of one or more processors, etc.). For example, a machine accessible medium includes recordable/non-recordable magnetic, optical and solid-state media (e.g., read only memory (ROM), programmable read only memory (PROM), erasable programmable read only memory (EPROM), electrically erasable programmable read only memory (EEPROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. According to the present embodiment, the machine-accessible medium may include the memories associated with the network computers 56, 76, 110, 112 and the memories 312, 316 of the controller 310.

In regard to the gaming units 54 (and gaming units 74, 75, 94), the programs or portions of programs may be stored remotely, outside of the gaming unit 54, and may control the operation of the gaming unit 54 from a remote location. Such remote control may be facilitated with the use of a wireless connection, or by an Internet interface that connects the gaming unit 54 with a remote computer (such as the network computer 56) having a memory in which the computer program portions are stored. By storing the programs or portions of programs therein, various portions of the memories are physically and/or structurally configured in accordance with the instructions of the programs or portions of programs.

Main Gaming Routine

Figure 4:
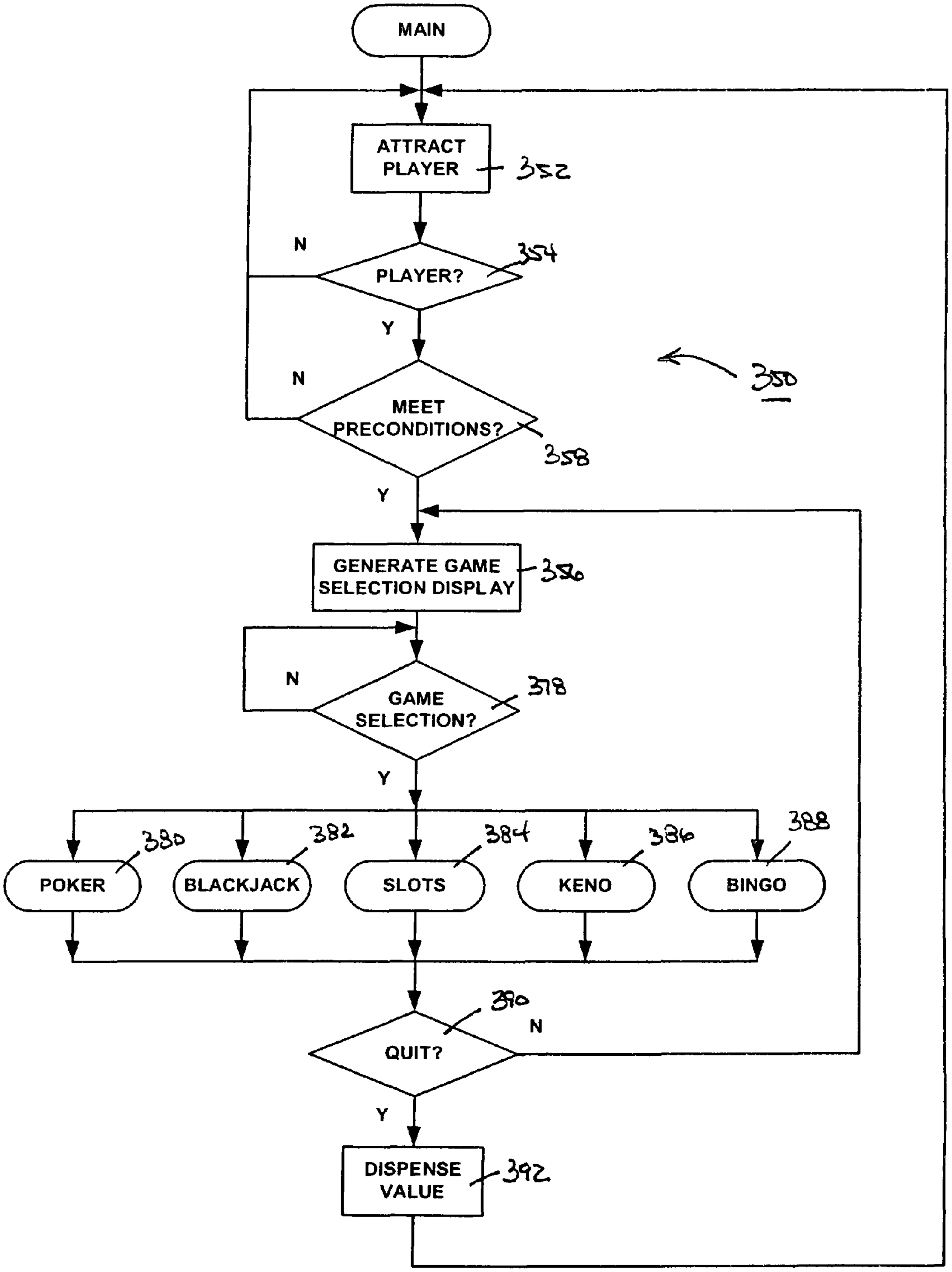
FIG. 4 is a flowchart of an embodiment of a main gaming routine that may be performed during operation of one or more of the gaming units.

FIG. 4 is a flowchart of a gaming main operating routine 350 that may be stored in the memory of the controller 310. Referring to FIG. 4, the main routine 350 may begin operation at block 352 during which an attraction sequence may be performed in an attempt to induce a potential player in a casino to play the gaming unit 54. The attraction sequence may be performed by displaying one or more video images on the display unit 274 (if provided as a video display unit) and/or causing one or more sound segments, such as voice or music, to be generated via the speakers 270. The attraction sequence may include a scrolling list of games that may be played on the gaming unit 54 and/or video images of various games being played, such as video poker, video blackjack, video slots, video keno, video bingo, etc.

During performance of the attraction sequence, if a potential player makes any input to the gaming unit 54 as determined at block 354, the attraction sequence may be terminated. The gaming unit 54 may detect an input at block 354 in various ways. For example, the gaming unit 54 could detect if the player presses any button on the gaming unit 54; the gaming unit 54 could determine if the player deposited one or more coins into the gaming unit 54; the gaming unit 54 could determine if player deposited paper currency into the gaming unit; etc.

After terminating the attraction sequence, the routine 350 may proceed to a block 356, and a game-selection display may be generated on the display unit 274 (if provided as a video display unit) to allow the player to select a game available on the gaming unit 54. However, according to certain embodiments of the system 50, the gaming units may be provided at locations remote from the place of business of the operator of the system 50. In such a situation, it may be necessary to ensure that certain preconditions are met before the player is permitted to place a wager and play a game. A block 358 is shown in FIG. 4, and represents a determination as to whether a player has met the preconditions for placing a wager and playing a game. The determination represented by the block 358 in FIG. 4 may be discussed in greater detail with reference to a verification routine 360 in FIG. 5.

Figure 5:
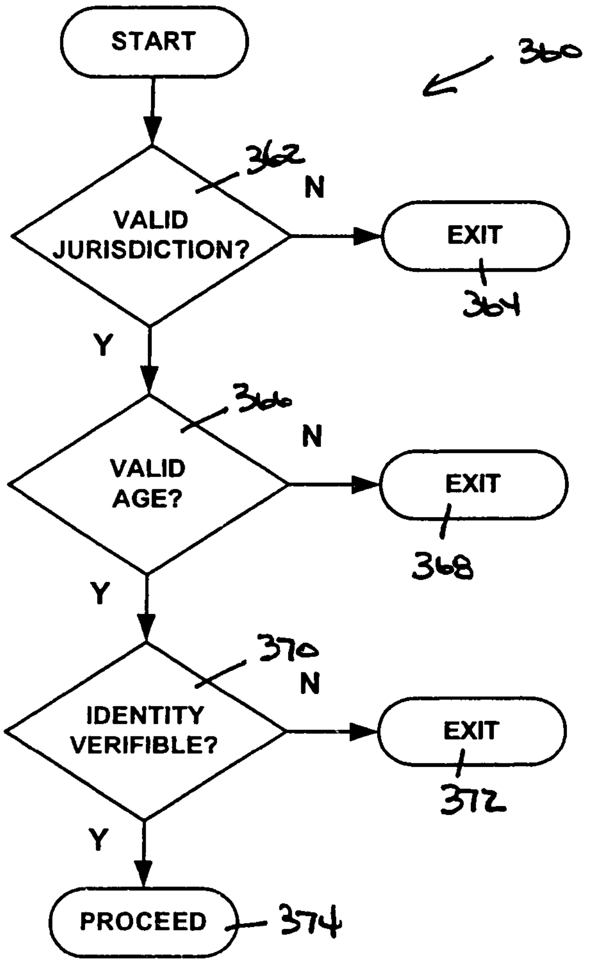
FIG. 5 is a flowchart of an embodiment of a verification routine that may be performed during the operation of the main gaming routine of FIG. 4.

According to FIG. 5, the verification routine 360 begins at a block 362, wherein a determination may be made at to whether the gaming unit (e.g., gaming unit 184) is located in a jurisdiction that permits gaming. As one such embodiment, the gaming unit may be associated with a device that provides location data for the gaming unit that may be transmitted to the gaming system operator. For example, the Global Positioning Satellite (GPS) system may be utilized by associating a special transceiver with the gaming unit. As a further example, the gaming system operator may require the player to connect to the system 50 using a cellular mobile station (or at a minimum to make a call using the mobile station or to turn the cellular mobile station on during play). The gaming system operator may then access the location information available to the cellular system operator after the cellular system operator has processed the cellular transmission data from the mobile station (such as may be done in providing enhanced 911 (or E-911) service, for example). Alternatively, the player may be required to connect to the system 50 from a land line (or to call the gaming system operator using a land line telephone during the verification process), whereupon the gaming system operator may check the telephone company's records to verify the number and pull the street address associated with the number. As a further alternative, where the player has connected to the system 50 over the Internet, the gaming system operator may check the IP address of the gaming unit and of the Internet service provider, and obtain a street address from the Internet service provider. If the determination is made that the gaming unit is not located in a jurisdiction that permits gaming, the routine exits at a block 364, and the routine 350 returns to the block 352; otherwise, routine passes to a block 366.

At the block 366, a determination may be made as to whether the player meets minimum age requirements (set by state gaming agencies, for example) necessary to operate the gaming unit. For example, a registration event at the gaming system operator's place of business, the player may provide proof of age and identity. The data may then be stored in a memory, such as a server operating as a database at the gaming system operator's place of business or a more portable memory device, such as a memory card or a PDA. The age data may be accessed later to prove age qualification by matching (within established standards) the identity data stored with the age data. If the determination is made and the player fails to age qualify, then the routine 360 may exit at block 368, and the routine 350 returns to the block 352; if the player age qualifies or the determination is omitted, then the routine proceeds to block 370.

At the block 370, a determination may be made as to whether the identify of the player can be verified. The determination of block 370 may be omitted where the gaming system operator can limit access by underage players to the gaming units (for example, in a casino-type gaming environment as opposed to an Internet-type gaming environment). However, the system operator may require that the player provide a form of identification (such as a fingerprint or other form of biometric data, driver's license, or national identity card) that the gaming system operator may use to access age data established by a third party (for example, the state department of motor vehicles). As an alternative, a camera associated with the gaming unit may be used to monitor the player using the gaming unit to verify identity. If the player fails to provide or is unwilling to provide proper verification of identify, the routine 370 exists at a block 372 and the routine 350 returns to the block 352; alternatively, the routine 360 passes to a block 374, and the routine 350 passes to the block 356.

The game-selection display generated at block 356 may include, for example, a list of video games that may be played on the gaming unit 54 and/or a visual message to prompt the player to deposit value into the gaming unit 54. While the game-selection display is generated, the gaming unit 54 may wait for the player to make a game selection. Upon selection of one of the games by the player as determined at block 378, the controller 310 may cause one of a number of game routines to be performed to allow the selected game to be played. For example, the game routines could include a video poker routine 380, a video blackjack routine 382, a slots routine 384, a video keno routine 386, and a video bingo routine 388. At block 378, if no game selection is made within a given period of time, the operation may branch back to block 352.

After one of the routines 380, 382, 384, 386, 388 has been performed to allow the player to play one of the games, block 390 may be utilized to determine whether the player wishes to terminate play on the gaming unit 54 or to select another game. If the player wishes to stop playing the gaming unit 54, which wish may be expressed, for example, by selecting a "Cash Out" button, the controller 310 may dispense value to the player at block 392 based on the outcome of the game(s) played by the player. The operation may then return to block 352. If the player did not wish to quit as determined at block 390, the routine may return to block 356 where the game-selection display may again be generated to allow the player to select another game.

It should be noted that although five gaming routines are shown in FIG. 4, a different number of routines could be included to allow play of a different number of games. The gaming unit 54 may also be programmed to allow play of different games.

Figure 6:
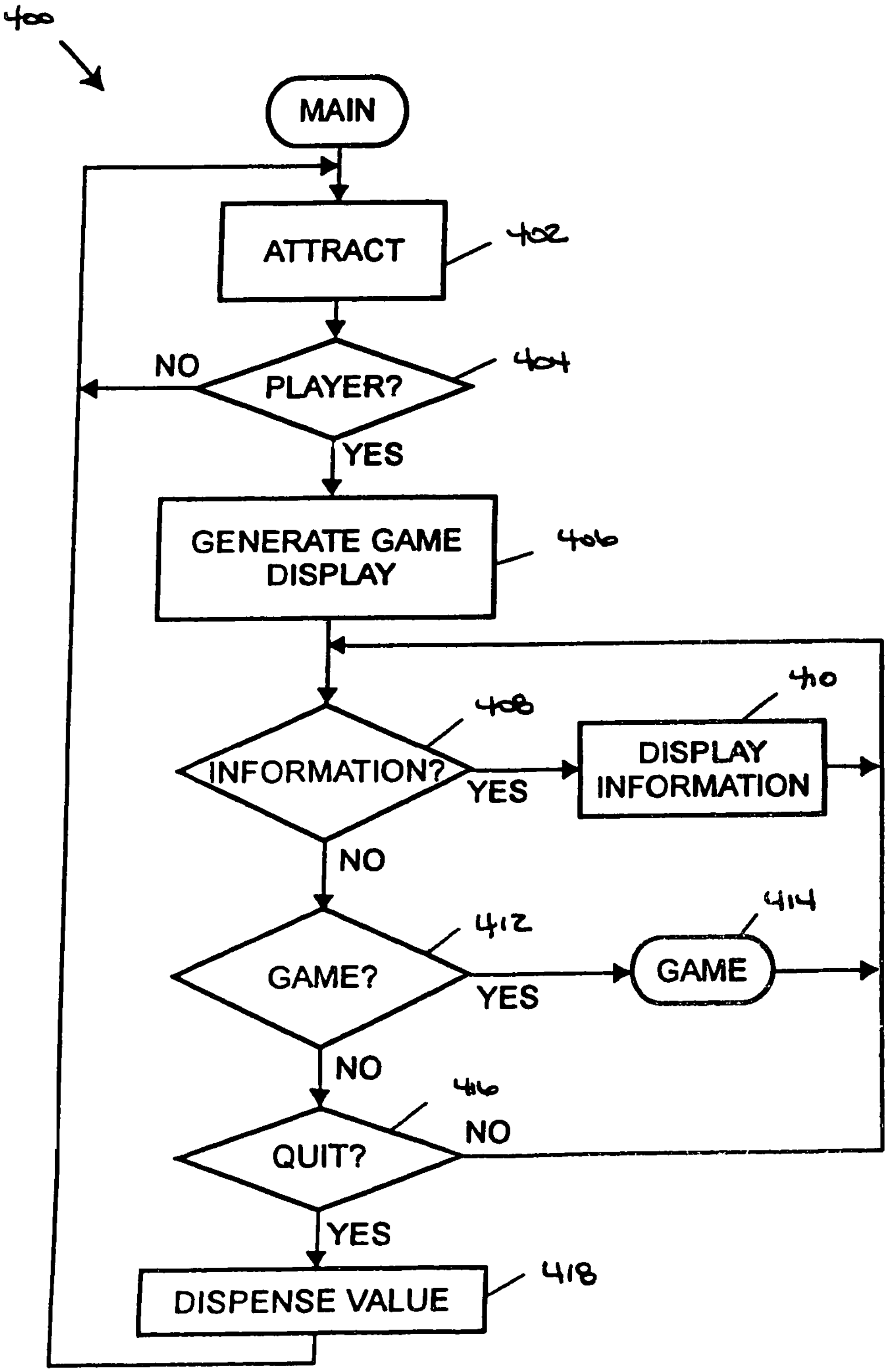
FIG. 6 is a flowchart of an alternative embodiment of a main gaming routine that may be performed during operation of one or more of the gaming units.

FIG. 6 is a flowchart of an alternative main operating routine 400 that may be stored in the memory of the controller 310. The main routine 400 may be utilized for gaming units 54 that are designed to allow play of only a single game or single type of game, and does not include the preconditions block shown in the routine of FIG. 4, although the routine of FIG. 6 may be altered to include such block. Referring to FIG. 6, the main routine 400 may begin operation at block 402 during which an attraction sequence may be performed in an attempt to induce a potential player in a casino to play the gaming unit 54. The attraction sequence may be performed by displaying one or more video images on the display unit 274 (if provided as a video display unit) and/or causing one or more sound segments, such as voice or music, to be generated via the speakers 270.

During performance of the attraction sequence, if a potential player makes any input to the gaming unit 54 as determined at block 404, the attraction sequence may be terminated and a game display may be generated on the display unit 274 (if provided as a video display unit) at block 406. The game display generated at block 406 may include, for example, an image of the casino game that may be played on the gaming unit 54 and/or a visual message to prompt the player to deposit value into the gaming unit 54. At block 408, the gaming unit 54 may determine if the player requested information concerning the game, in which case the requested information may be displayed at block 410. Block 412 may be used to determine if the player requested initiation of a game, in which case a game routine 414 may be performed. The game routine 414 could be any one of the game routines disclosed herein, such as one of the five game routines 380, 382, 384, 386, 388, or another game routine.

After the routine 414 has been performed to allow the player to play the game, block 416 may be utilized to determine whether the player wishes to terminate play on the gaming unit 54. If the player wishes to stop playing the gaming unit 54, which wish may be expressed, for example, by selecting a "Cash Out" button, the controller 310 may dispense value to the player at block 418 based on the outcome of the game(s) played by the player. The operation may then return to block 402. If the player did not wish to quit as determined at block 416, the operation may return to block 406.

Figure 7:
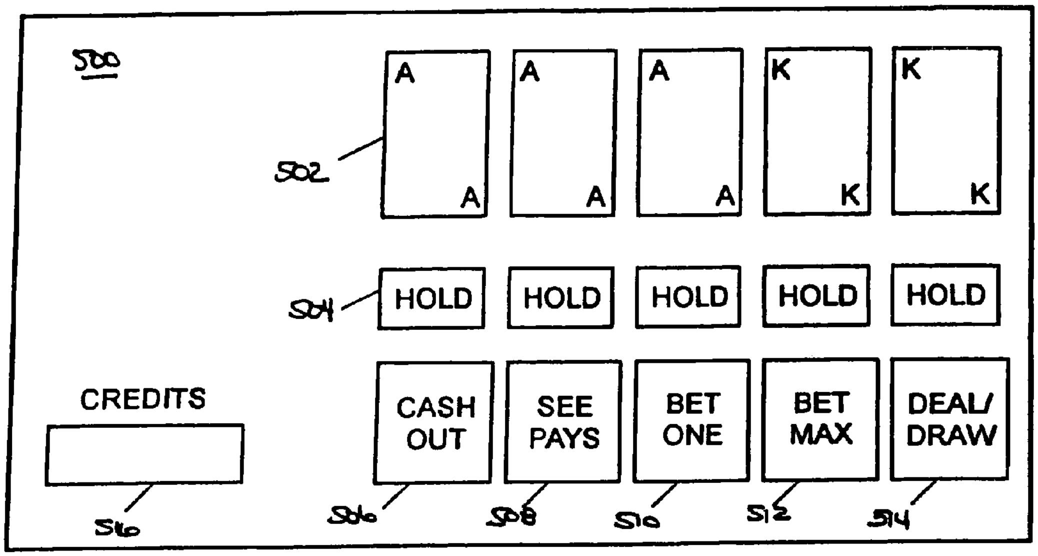
FIG. 7 is an illustration of an embodiment of a visual display that may be displayed during performance of the video poker routine of FIG. 9.

Video Poker

Where the gaming unit 54 is designed to facilitate play of a video poker game, the display unit 274 may comprise a video display unit. FIG. 7 is an exemplary display 500 that may be shown on the display unit 274 during performance of the video poker routine 380 shown schematically in FIG. 4. Referring to FIG. 7, the display 500 may include video images 502 of a plurality of playing cards representing the player's hand, such as five cards. To allow the player to control the play of the video poker game, a plurality of player-selectable buttons may be displayed. The buttons may include a "Hold" button 504 disposed directly below each of the playing card images 502, a "Cash Out" button 506, a "See Pays" button 508, a "Bet One Credit" button 510, a "Bet Max Credits" button 512, and a "Deal/Draw" button 514. The display 500 may also include an area 516 in which the number of remaining credits or value is displayed. If the display unit 274 is provided with a touch-sensitive screen, the buttons 504, 506, 508, 510, 512, 514 may form part of the video display 500. Alternatively, one or more of those buttons may be provided as part of a control panel that is provided separately from the display unit 274.

Figure 9:
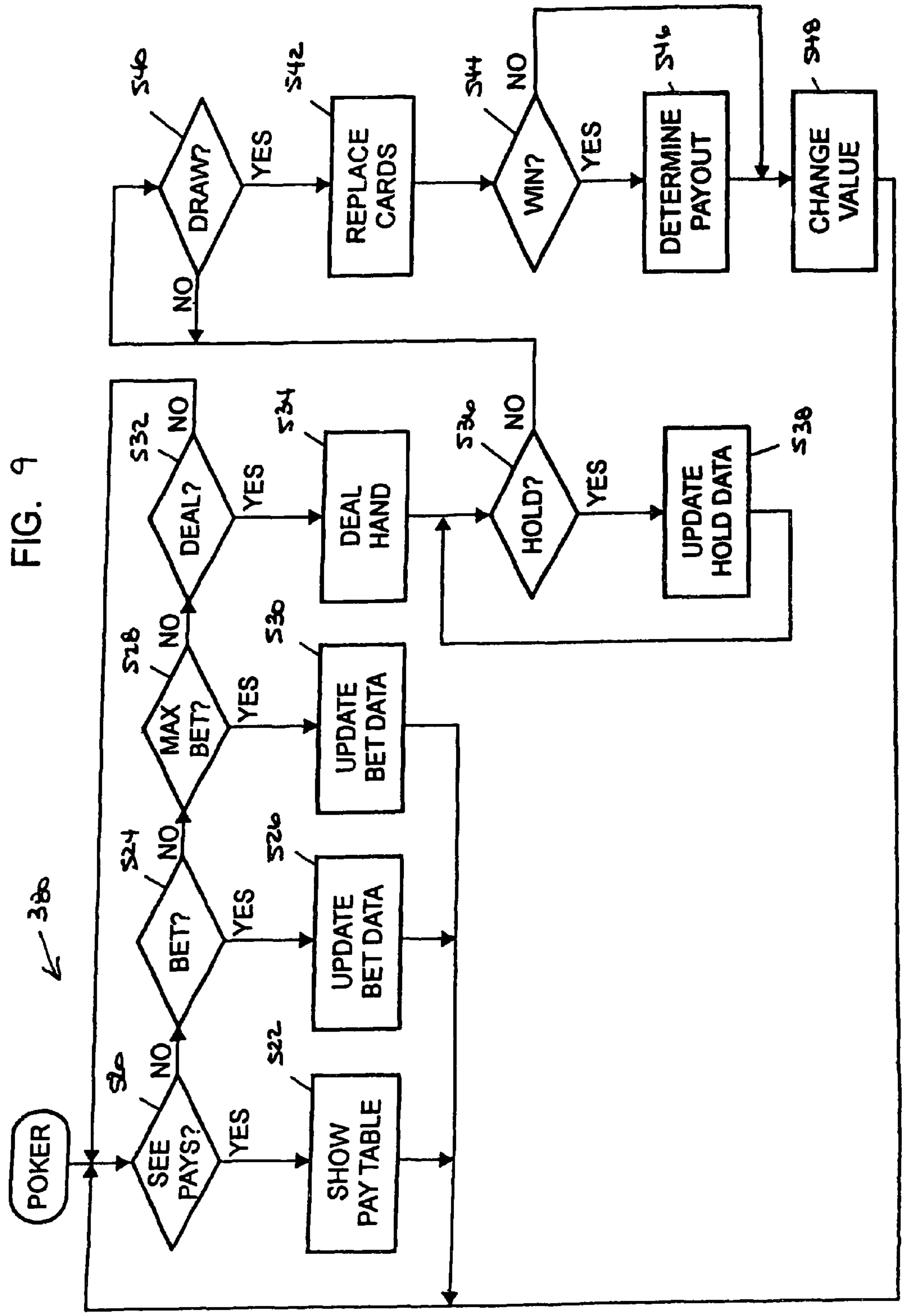
FIG. 9 is a flowchart of an embodiment of a video poker routine that may be performed by one or more of the gaming units.

FIG. 9 is a flowchart of the video poker routine 360 shown schematically in FIG. 4. Referring to FIG. 9, at block 520, the routine may determine whether the player has requested payout information, such as by activating the "See Pays" button 508, in which case at block 522 the routine may cause one or more pay tables to be displayed on the display unit 274. At block 524, the routine may determine whether the player has made a bet, such as by pressing the "Bet One Credit" button 510, in which case at block 526 bet data corresponding to the bet made by the player may be stored in the memory of the controller 310. At block 528, the routine may determine whether the player has pressed the "Bet Max Credits" button 512, in which case at block 530 bet data corresponding to the maximum allowable bet may be stored in the memory of the controller 310.

At block 532, the routine may determine if the player desires a new hand to be dealt, which may be determined by detecting if the "Deal/Draw" button 514 was activated after a wager was made. In that case, at block 534 a video poker hand may be "dealt" by causing the display unit 274 to generate the playing card images 502. After the hand is dealt, at block 536 the routine may determine if any of the "Hold" buttons 504 have been activated by the player, in which case data regarding which of the playing card images 502 are to be "held" may be stored in the controller 310 at block 538. If the "Deal/Draw" button 514 is activated again as determined at block 540, each of the playing card images 502 that was not "held" may be caused to disappear from the video display 500 and to be replaced by a new, randomly selected, playing card image 502 at block 542.

At block 544, the routine may determine whether the poker hand represented by the playing card images 502 currently displayed is a winner. That determination may be made by comparing data representing the currently displayed poker hand with data representing all possible winning hands, which may be stored in the memory of the controller 310. If there is a winning hand, a payout value corresponding to the winning hand may be determined at block 546. At block 548, the player's cumulative value or number of credits may be updated by subtracting the bet made by the player and adding, if the hand was a winner, the payout value determined at block 546. The cumulative value or number of credits may also be displayed in the display area 516 (FIG. 7).

Although the video poker routine 380 is described above in connection with a single poker hand of five cards, the routine 380 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 8:
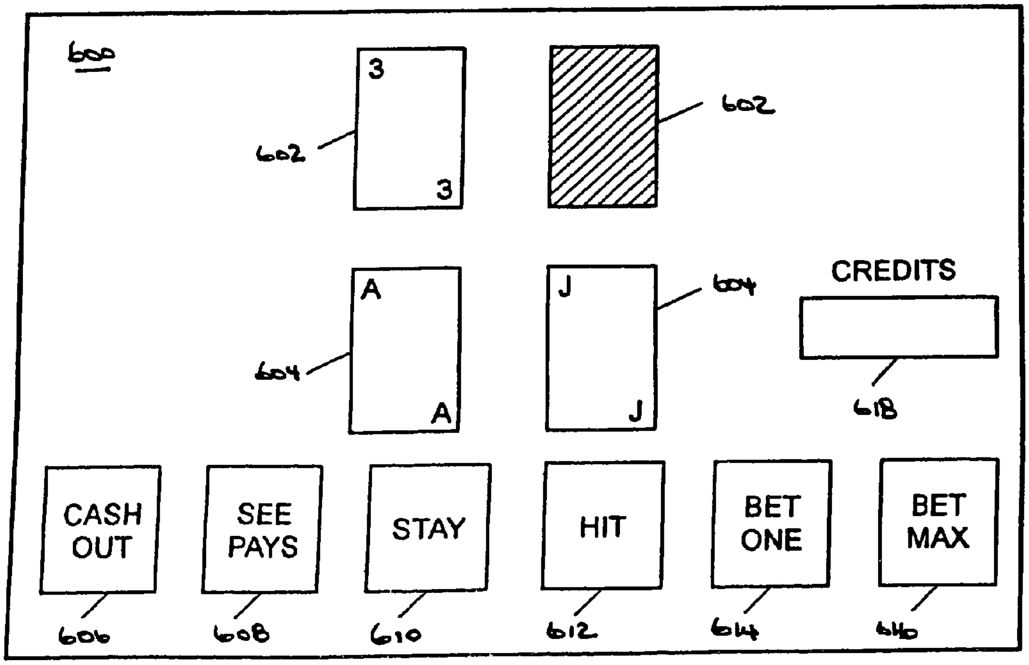
FIG. 8 is an illustration of an embodiment of a visual display that may be displayed during performance of the video blackjack routine of FIG. 10.

Video Blackjack

Where the gaming unit 54 is designed to facilitate play of a video blackjack game, the display unit 274 may comprise a video display unit. FIG. 8 is an exemplary display 600 that may be shown on the display unit 274 during performance of the video blackjack routine 382 shown schematically in FIG. 4. Referring to FIG. 8, the display 600 may include video images 602 of a pair of playing cards representing a dealer's hand, with one of the cards shown face up and the other card being shown face down, and video images 604 of a pair of playing cards representing a player's hand, with both the cards shown face up. The "dealer" may be the gaming unit 54.

To allow the player to control the play of the video blackjack game, a plurality of player-selectable buttons may be displayed. The buttons may include a "Cash Out" button 606, a "See Pays" button 608, a "Stay" button 610, a "Hit" button 612, a "Bet One Credit" button 614, and a "Bet Max Credits" button 616. The display 600 may also include an area 618 in which the number of remaining credits or value is displayed. If the display unit 274 is provided with a touch-sensitive screen, the buttons 606, 608, 610, 612, 614, 616 may form part of the video display 600. Alternatively, one or more of those buttons may be provided as part of a control panel that is provided separately from the display unit 274.

Figure 10:
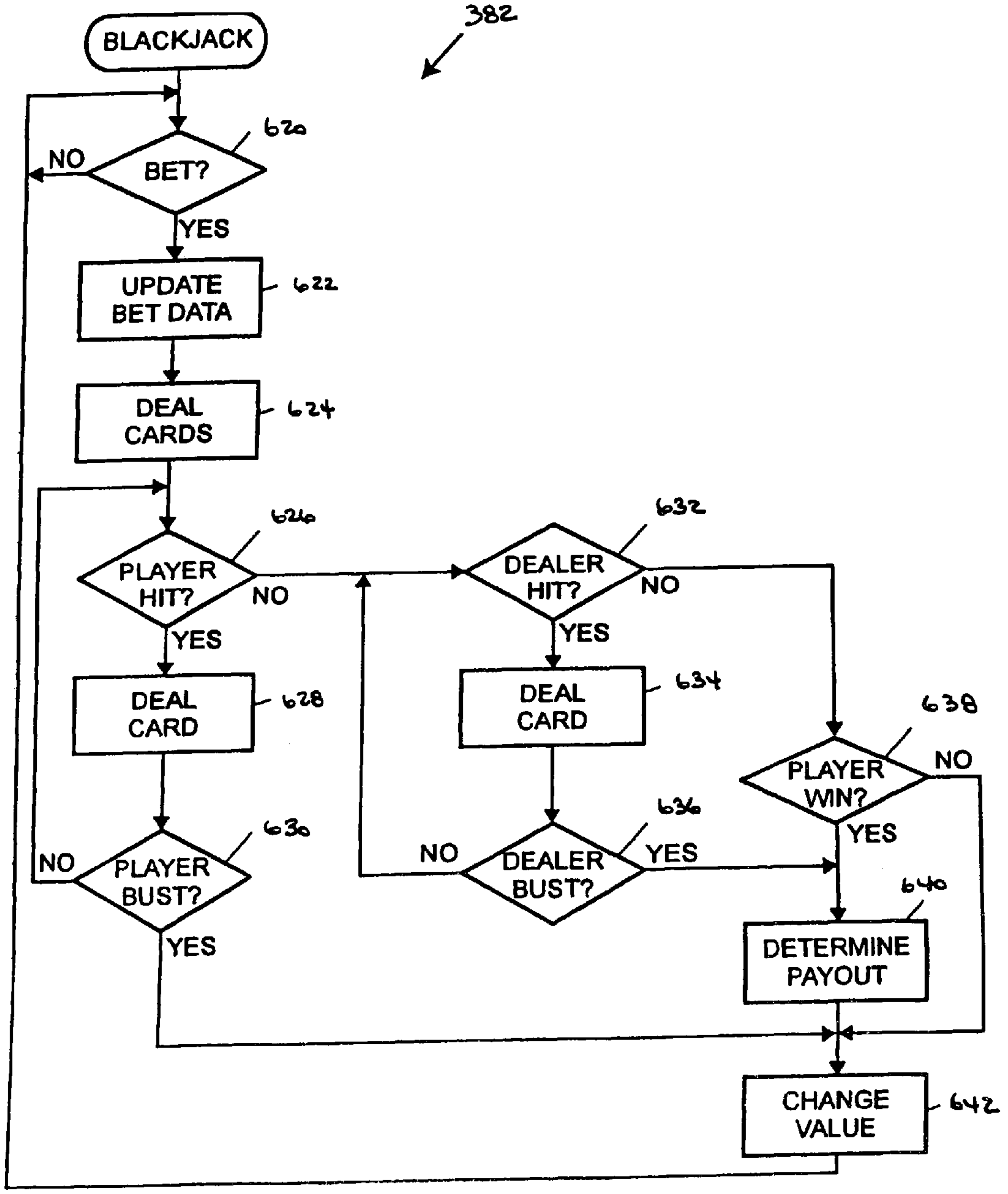
FIG. 10 is a flowchart of an embodiment of a video blackjack routine that may be performed by one or more of the gaming units.

FIG. 10 is a flowchart of the video blackjack routine 382 shown schematically in FIG. 4. Referring to FIG. 10, the video blackjack routine 382 may begin at block 620 where it may determine whether a bet has been made by the player. That may be determined, for example, by detecting the activation of either the "Bet One Credit" button 614 or the "Bet Max Credits" button 616. At block 622, bet data corresponding to the bet made at block 620 may be stored in the memory of the controller 310. At block 624, a dealer's hand and a player's hand may be "dealt" by making the playing card images 602, 604 appear on the display unit 274.

At block 626, the player may be allowed to be "hit," in which case at block 628 another card will be dealt to the player's hand by making another playing card image 604 appear in the display 600. If the player is hit, block 630 may determine if the player has "bust," or exceeded 21. If the player has not bust, blocks 626 and 628 may be performed again to allow the player to be hit again.

If the player decides not to hit, at block 632 the routine may determine whether the dealer should be hit. Whether the dealer hits may be determined in accordance with predetermined rules, such as the dealer always hit if the dealer's hand totals 15 or less. If the dealer hits, at block 634 the dealer's hand may be dealt another card by making another playing card image 602 appear in the display 600. At block 636 the routine may determine whether the dealer has bust. If the dealer has not bust, blocks 632, 634 may be performed again to allow the dealer to be hit again.

If the dealer does not hit, the outcome of the blackjack game and a corresponding payout may be determined based on, for example, whether the player or the dealer has the higher hand that does not exceed 21, as determined at block 638. If the player has a winning hand, a payout value corresponding to the winning hand may be determined at block 640. At block 642, the player's cumulative value or number of credits may be updated by subtracting the bet made by the player and adding, if the player won, the payout value determined at block 640. The cumulative value or number of credits may also be displayed in the display area 618 (FIG. 8).

Figure 11:
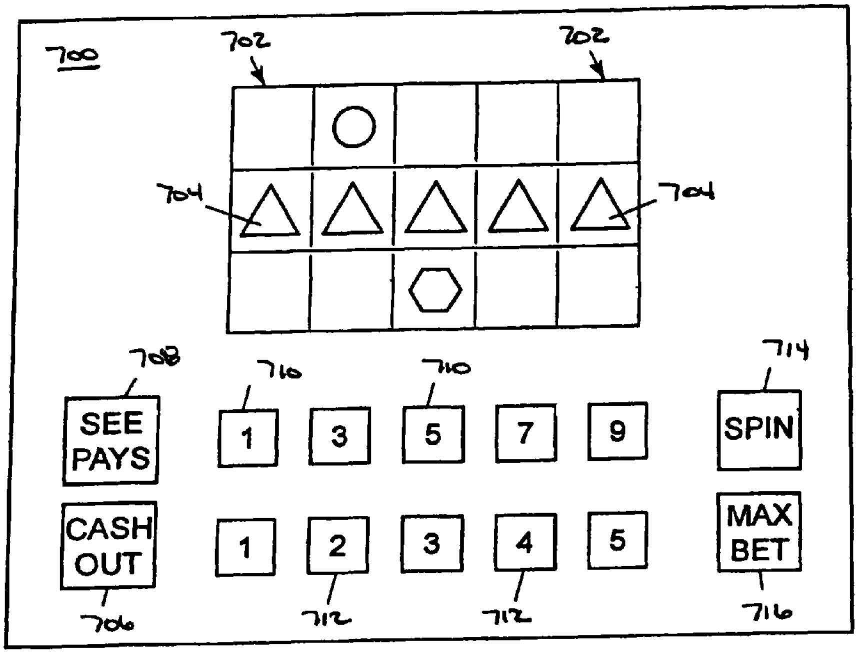
FIG. 11 is an illustration of an embodiment of a visual display that may be displayed during performance of the slots routine of FIG. 13.

Slots

Where the gaming unit 54 is designed to facilitate play of a video slots game, the display unit 274 may comprise a video display unit. FIG. 11 is an exemplary display 700 that may be shown on the display unit 274 during performance of the slots routine 384 shown schematically in FIG. 4. Referring to FIG. 11, the display 700 may include video images 702 of a plurality of slot machine reels, each of the reels having a plurality of reel symbols 704 associated therewith. Although the display 700 shows five reel images 702, each of which may have three reel symbols 704 that are visible at a time, other reel configurations could be utilized.

To allow the player to control the play of the slots game, a plurality of player-selectable buttons may be displayed. The buttons may include a "Cash Out" button 706, a "See Pays" button 708, a plurality of payline-selection buttons 710 each of which allows the player to select a different number of paylines prior to "spinning" the reels, a plurality of bet-selection buttons 712 each of which allows a player to specify a wager amount for each payline selected, a "Spin" button 714, and a "Max Bet" button 716 to allow a player to make the maximum wager allowable.

Figure 13:
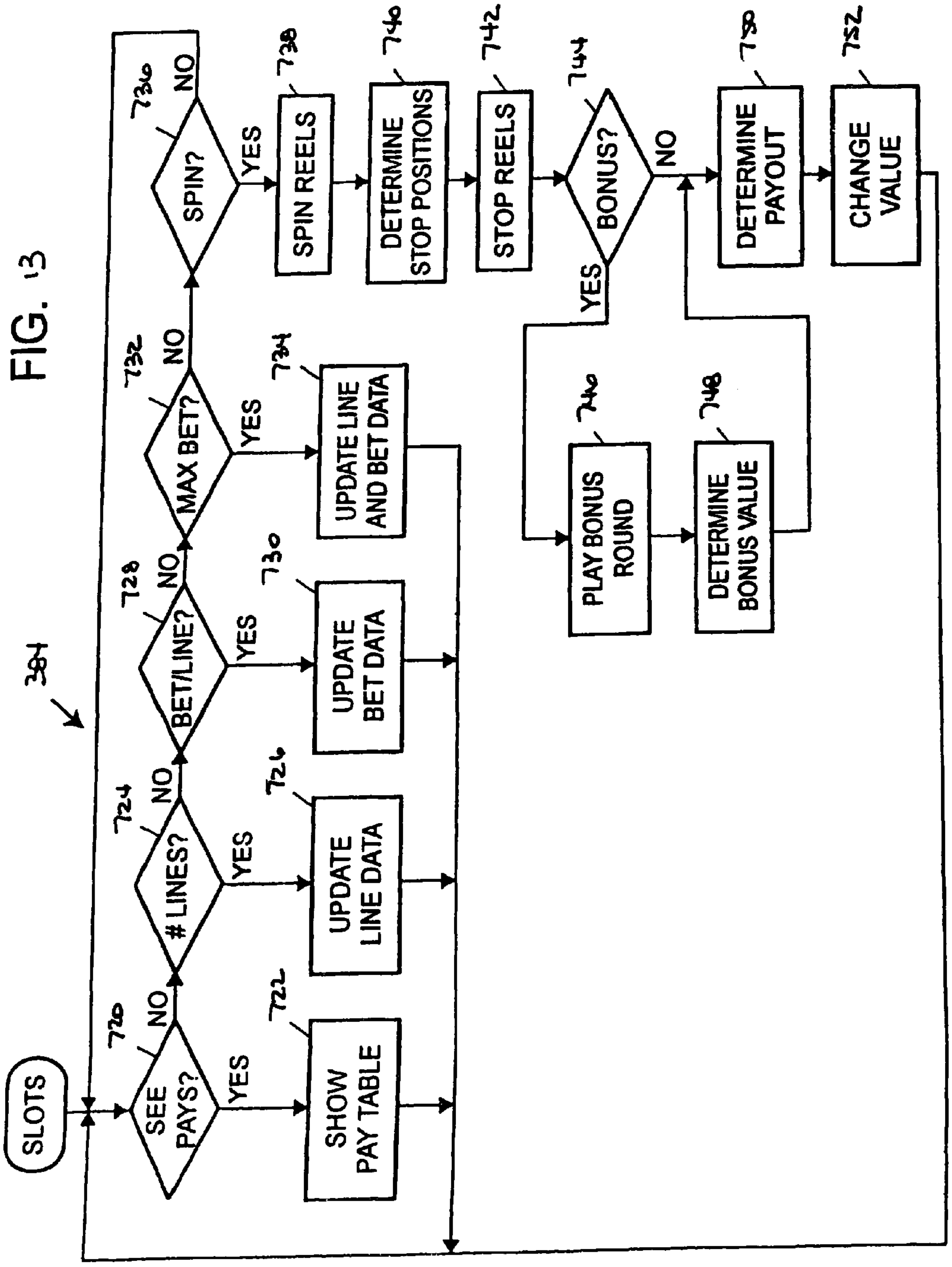
FIG. 13 is a flowchart of an embodiment of a slots routine that may be performed by one or more of the gaming units.

FIG. 13 is a flowchart of the slots routine 384 shown schematically in FIG. 4. Referring to FIG. 13, at block 720, the routine may determine whether the player has requested payout information, such as by activating the "See Pays" button 708, in which case at block 722 the routine may cause one or more pay tables to be displayed on the display unit 274. At block 724, the routine may determine whether the player has pressed one of the payline-selection buttons 710, in which case at block 726 data corresponding to the number of paylines selected by the player may be stored in the memory of the controller 310. At block 728, the routine may determine whether the player has pressed one of the bet-selection buttons 712, in which case at block 730 data corresponding to the amount bet per payline may be stored in the memory of the controller 310. At block 732, the routine may determine whether the player has pressed the "Max Bet" button 716, in which case at block 734 bet data (which may include both payline data and bet-per-payline data) corresponding to the maximum allowable bet may be stored in the memory of the controller 310.

If the "Spin" button 714 has been activated by the player as determined at block 736, at block 738 the routine may cause the slot machine reel images 702 to begin "spinning" so as to simulate the appearance of a plurality of spinning mechanical slot machine reels. At block 740, the routine may determine the positions at which the slot machine reel images will stop, or the particular symbol images 704 that will be displayed when the reel images 702 stop spinning. At block 742, the routine may stop the reel images 702 from spinning by displaying stationary reel images 702 and images of three symbols 704 for each stopped reel image 702. The reels may be stopped from left to right, from the perspective of the player, or in any other manner or sequence.

The routine may provide for the possibility of a bonus game or round if certain conditions are met, such as the display in the stopped reel images 702 of a particular symbol 704. If there is such a bonus condition as determined at block 744, the routine may proceed to block 746 where a bonus round may be played. The bonus round may be a different game than slots, and many other types of bonus games could be provided. If the player wins the bonus round, or receives additional credits or points in the bonus round, a bonus value may be determined at block 748. A payout value corresponding to outcome of the slots game and/or the bonus round may be determined at block 750. At block 752, the player's cumulative value or number of credits may be updated by subtracting the bet made by the player and adding, if the slot game and/or bonus round was a winner, the payout value determined at block 750.

Although the above routine has been described as a video slot machine routine in which slot machine reels are represented as images on the display unit 274, actual slot machine reels that are capable of being spun may be utilized instead, in which case the display unit 274 could be provided in the form of a plurality of mechanical reels that are rotatable, each of the reels having a plurality of reel images disposed thereon.

Moreover, it will be recognized that the determination of whether the player should receive a payout corresponding to the outcome of the slots game, an opportunity to play the bonus game, and/or receive a payout corresponding to the outcome of the bonus game may be made before the reels start "spinning." That is, the outcome of the slots game may be determined shortly after the wager is made and the "Spin" button 714 is depressed, with the animation of the reels (whether mechanical, electromechanical, or electrical) being selected according to the outcome to signal the player that a particular outcome has been determined. Likewise, the determination of whether the outcome will provide the opportunity of a bonus game may be made before the animation of the reels, and the outcome of the bonus game before the bonus game is displayed. As a consequence, the order of the determination of the outcome of the slots game or bonus game and the animation of the reels need not be in the order shown in FIG. 13, and, in fact, may be in a different order without departing from the spirit and teaching of this disclosure. Similar remarks may be made in regard to the determinations of the outcomes and animations of the poker and blackjack routines discussed above, and the outcomes and animations of the keno and bingo routines discussed below.

Figure 12:
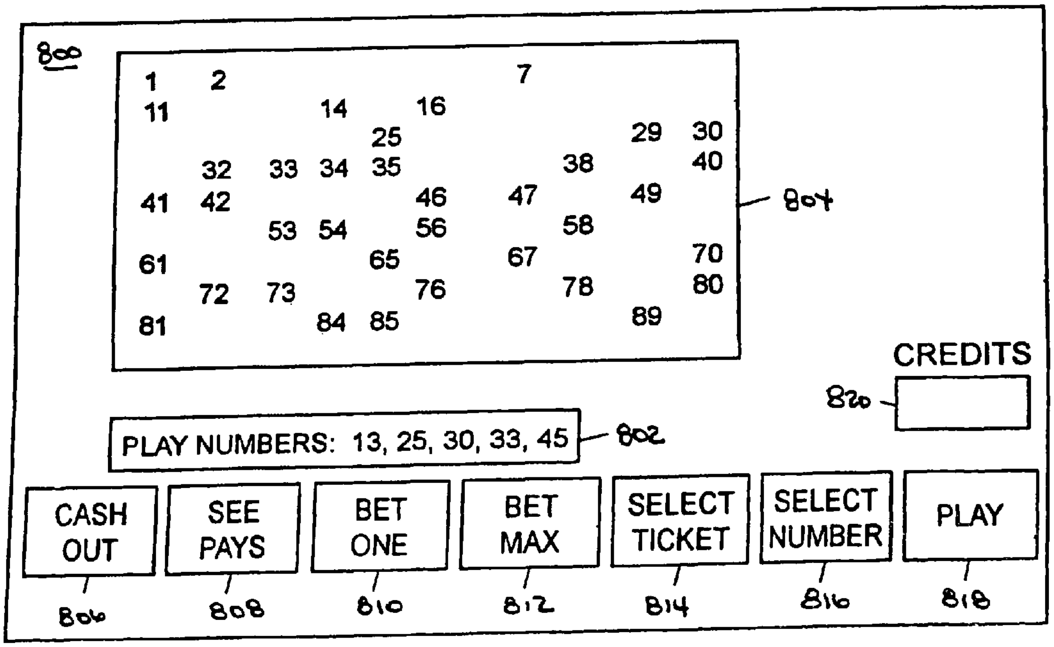
FIG. 12 is an illustration of an embodiment of a visual display that may be displayed during performance of the video keno routine of FIG. 14.

Video Keno

Where the gaming unit 54 is designed to facilitate play of a video keno game, the display unit 274 may comprise a video display unit. FIG. 12 is an exemplary display 800 that may be shown on the display unit 274 during performance of the video keno routine 386 shown schematically in FIG. 4. Referring to FIG. 12, the display 800 may include a video image 802 of a plurality of numbers that were selected by the player prior to the start of a keno game and a video image 804 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 806, a "See Pays" button 808, a "Bet One Credit" button 810, a "Bet Max Credits" button 812, a "Select Ticket" button 814, a "Select Number" button 816, and a "Play" button 818. The display 800 may also include an area 820 in which the number of remaining credits or value is displayed. If the display unit 274 is provided with a touch-sensitive screen, the buttons may form part of the video display 800. Alternatively, one or more of those buttons may be provided as part of a control panel that is provided separately from the display unit 274.

Figure 14:
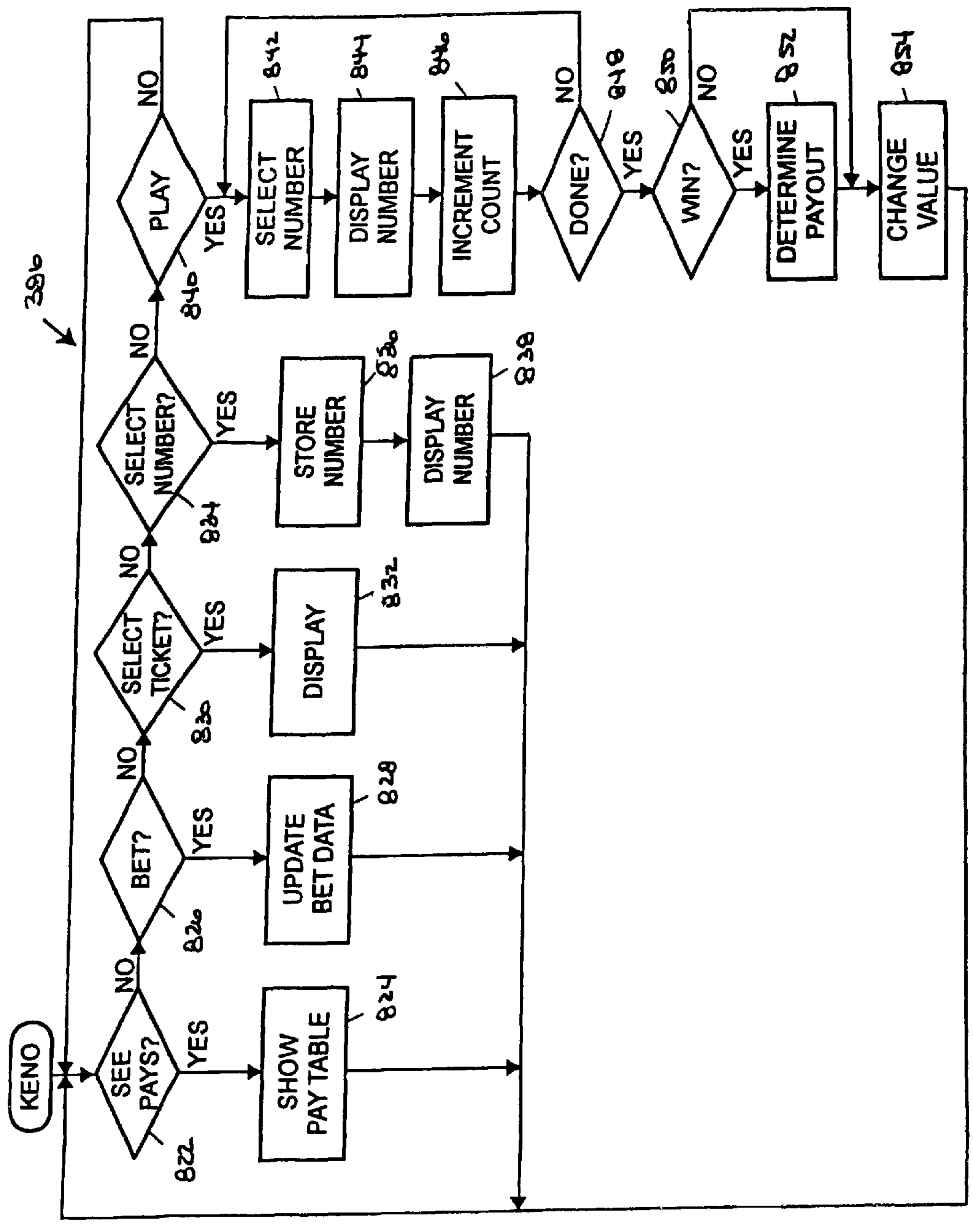
FIG. 14 is a flowchart of an embodiment of a video keno routine that may be performed by one or more of the gaming units.

FIG. 14 is a flowchart of the video keno routine 386 shown schematically in FIG. 4. The keno routine 386 may be utilized in connection with a single gaming unit 54 where a single player is playing a keno game, or the keno routine 386 may be utilized in connection with multiple gaming units 54 where multiple players are playing a single keno game. In the latter case, one or more of the acts described below may be performed either by the controller 310 in each gaming unit or by one of the network computers 56, 76, 110, 112 to which multiple gaming units 54 are operatively connected.

Referring to FIG. 14, at block 822, the routine may determine whether the player has requested payout information, such as by activating the "See Pays" button 808, in which case at block 824 the routine may cause one or more pay tables to be displayed on the display unit 274. At block 826, the routine may determine whether the player has made a bet, such as by having pressed the "Bet One Credit" button 810 or the "Bet Max Credits" button 812, in which case at block 828 bet data corresponding to the bet made by the player may be stored in the memory of the controller 310. After the player has made a wager, at block 830 the player may select a keno ticket, and at block 832 the ticket may be displayed on the display 800. At block 834, the player may select one or more game numbers, which may be within a range set by the casino. After being selected, the player's game numbers may be stored in the memory of the controller 310 at block 836 and may be included in the image 802 on the display 800 at block 838. After a certain amount of time, the keno game may be closed to additional players (where a number of players are playing a single keno game using multiple gambling units 54).

If play of the keno game is to begin as determined at block 840, at block 842 a game number within a range set by the casino may be randomly selected either by the controller 310 or a central computer operatively connected to the controller, such as one of the network computers 56, 76, 110, 112. At block 844, the randomly selected game number may be displayed on the display unit 274 and the display units 274 of other gaming units 54 (if any) which are involved in the same keno game. At block 846, the controller 310 (or the central computer noted above) may increment a count which keeps track of how many game numbers have been selected at block 842.

At block 848, the controller 310 (or one of the network computers 56, 76, 110, 112) may determine whether a maximum number of game numbers within the range have been randomly selected. If not, another game number may be randomly selected at block 842. If the maximum number of game numbers has been selected, at block 850 the controller 310 (or a central computer 56, 76, 110, 112) may determine whether there are a sufficient number of matches between the game numbers selected by the player and the game numbers selected at block 842 to cause the player to win. The number of matches may depend on how many numbers the player selected and the particular keno rules being used.

If there are a sufficient number of matches, a payout may be determined at block 852 to compensate the player for winning the game. The payout may depend on the number of matches between the game numbers selected by the player and the game numbers randomly selected at block 842. At block 854, the player's cumulative value or number of credits may be updated by subtracting the bet made by the player and adding, if the keno game was won, the payout value determined at block 852. The cumulative value or number of credits may also be displayed in the display area 820 (FIG. 12).

Figure 15:
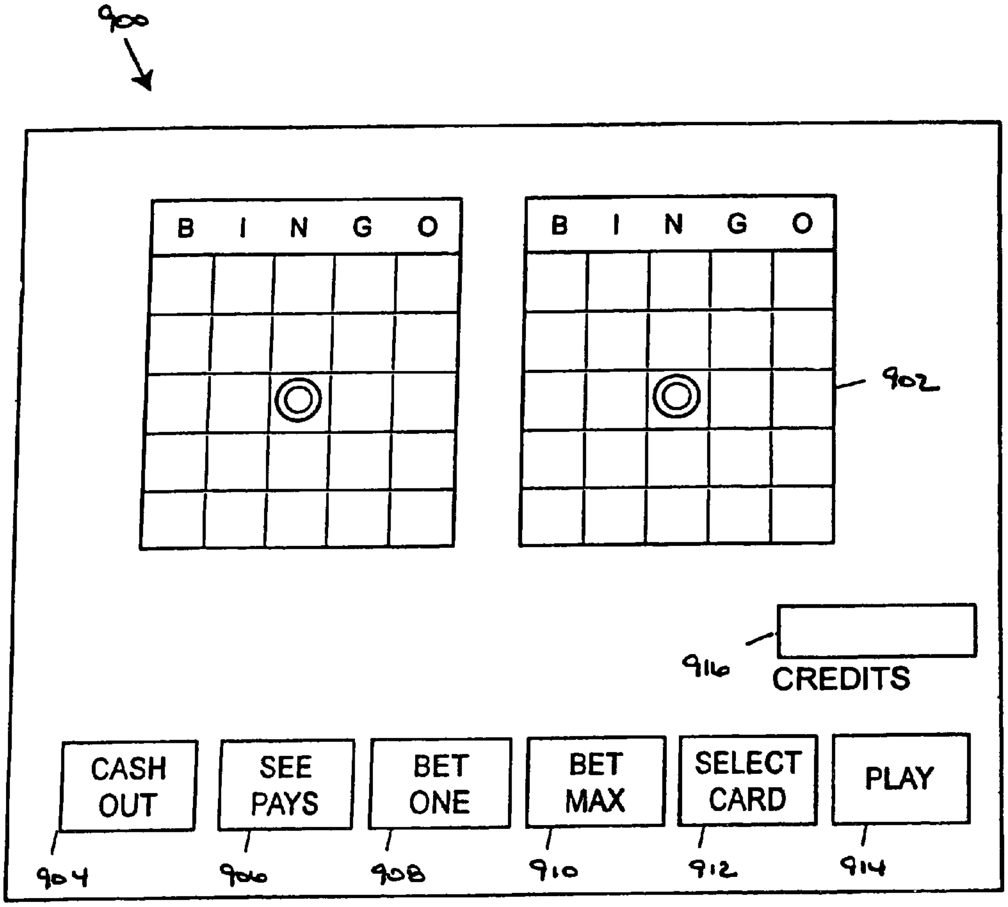
FIG. 15 is an illustration of an embodiment of a visual display that may be displayed during performance of the video bingo routine of FIG. 16.

Video Bingo

Where the gaming unit 54 is designed to facilitate play of a video bingo game, the display unit 274 may comprise a video display unit. FIG. 15 is an exemplary display 900 that may be shown on the display unit 274 during performance of the video bingo routine 388 shown schematically in FIG. 4. Referring to FIG. 15, the display 900 may include one or more video images 902 of a bingo card and images of the bingo numbers selected during the game. The bingo card images 902 may have a grid pattern.

To allow the player to control the play of the bingo game, a plurality of player-selectable buttons may be displayed. The buttons may include a "Cash Out" button 904, a "See Pays" button 906, a "Bet One Credit" button 908, a "Bet Max Credits" button 910, a "Select Card" button 912, and a "Play" button 914. The display 900 may also include an area 916 in which the number of remaining credits or value is displayed. If the display unit 274 is provided with a touch-sensitive screen, the buttons may form part of the video display 900. Alternatively, one or more of those buttons may be provided as part of a control panel that is provided separately from the display unit 274.

Figure 16:
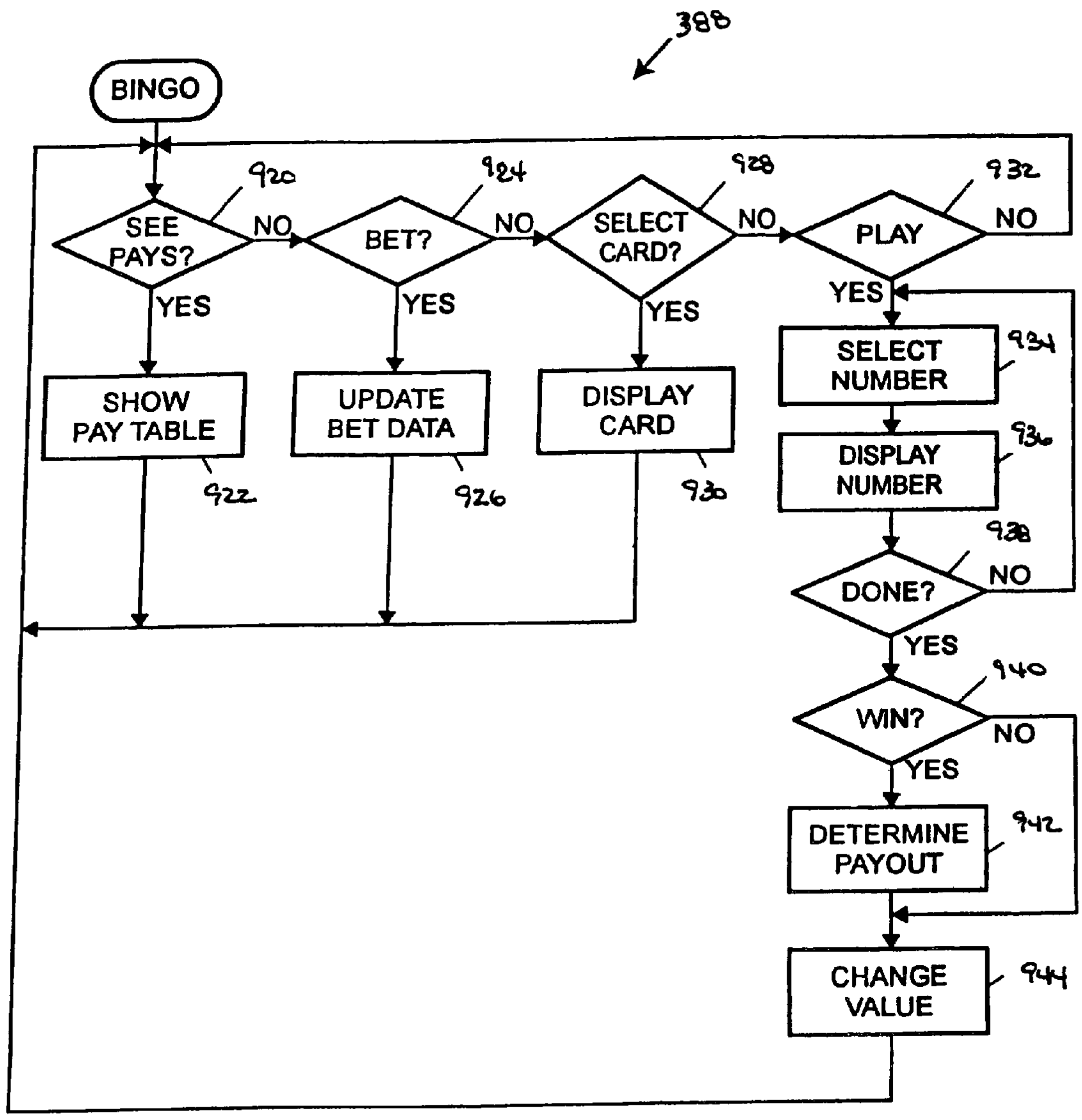
FIG. 16 is a flowchart of an embodiment of a video bingo routine that may be performed by one or more of the gaming units.

FIG. 16 is a flowchart of the video bingo routine 388 shown schematically in FIG. 4. The bingo routine 388 may be utilized in connection with a single gaming unit 54 where a single player is playing a bingo game, or the bingo routine 388 may be utilized in connection with multiple gaming units 54' where multiple players are playing a single bingo game. In the latter case, one or more of the acts described below may be performed either by the controller 310 in each gaming unit 54 or by one of the network computers 56, 76, 110, 112 to which multiple gaming units 54 are operatively connected.

Referring to FIG. 16, at block 920, the routine may determine whether the player has requested payout information, such as by activating the "See Pays" button 906, in which case at block 922 the routine may cause one or more pay tables to be displayed on the display unit 274. At block 924, the routine may determine whether the player has made a bet, such as by having pressed the "Bet One Credit" button 908 or the "Bet Max Credits" button 910, in which case at block 926 bet data corresponding to the bet made by the player may be stored in the memory of the controller 310.

After the player has made a wager, at block 928 the player may select a bingo card, which may be generated randomly. The player may select more than one bingo card, and there may be a maximum number of bingo cards that a player may select. The card or cards may be added to the display 900 at block 930. After play is to commence as determined at block 932, at block 934 a bingo number may be randomly generated by the controller 310 or a central computer such as one of the network computers 56, 76, 110, 112. At block 936, the bingo number may be displayed on the display unit 274 and the display units 274 of any other gaming units 54 involved in the bingo game.

At block 938, the controller 310 (or a central computer) may determine whether any player has won the bingo game. If no player has won, another bingo number may be randomly selected at block 934. If any player has bingo as determined at block 938, the routine may determine at block 940 whether the player playing that gaming unit 54 was the winner. If so, at block 942 a payout for the player may be determined. The payout may depend on the number of random numbers that were drawn before there was a winner, the total number of winners (if there was more than one player), and, the amount of money that was wagered on the game. At block 944, the player's cumulative value or number of credits may be updated by subtracting the bet made by the player and adding, if the bingo game was won, the payout value determined at block 942. The cumulative value or number of credits may also be displayed in the display area 916 (FIG. 15).

Merchandising Routine

Figure 17:
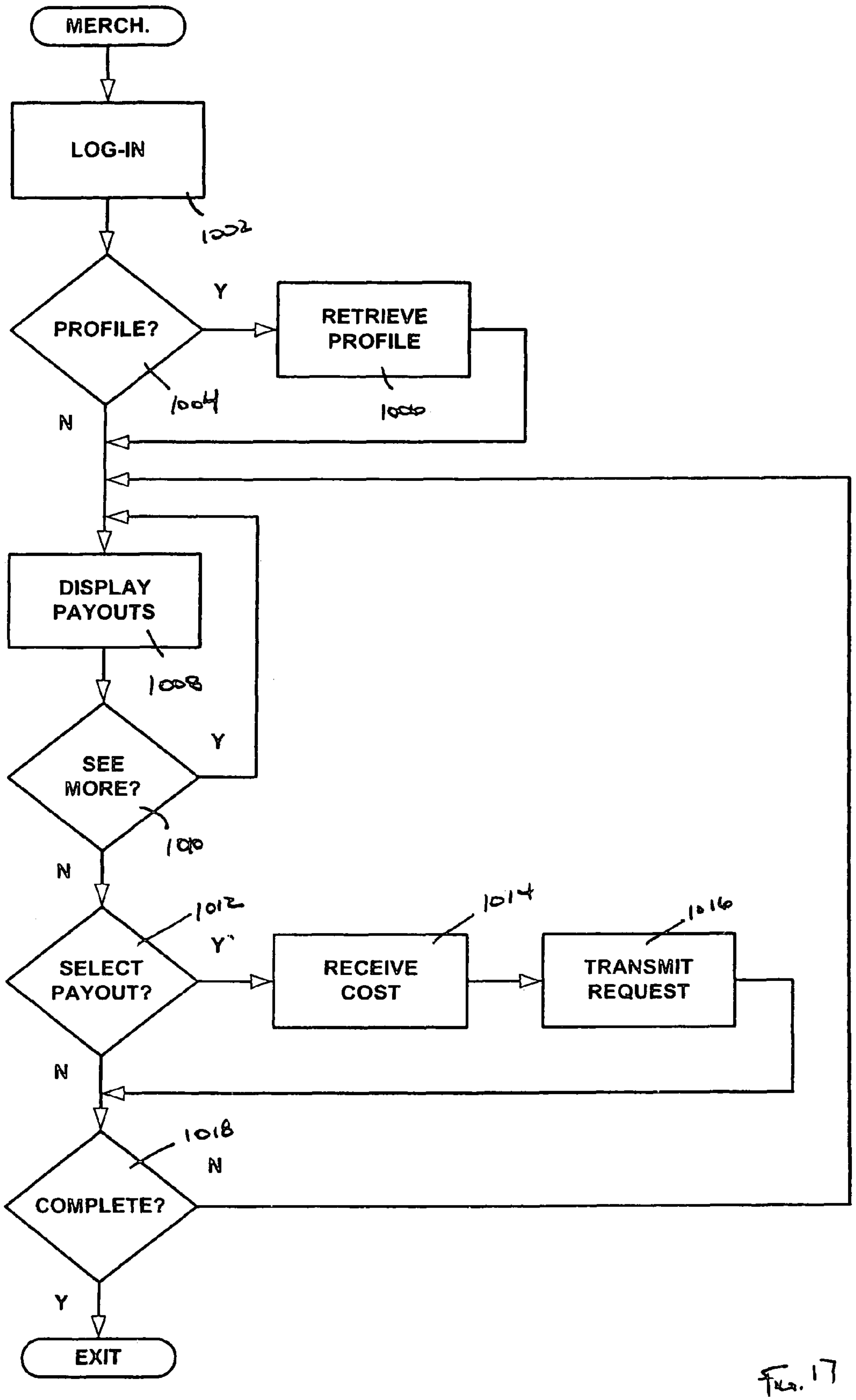
FIG. 17 is a flowchart of an embodiment of a merchandising routine that may be performed during the operation of the merchandising aspect of the system.

FIG. 17 is a flowchart of a merchandising routine 1000 that may be stored in the memory of one of the network computers (network computer 110, for example), which computer is operating as a server. Alternatively, the routine 1000 may be stored in the memory of one of the gaming units, which gaming unit like the gaming units 94 of the network 92 share the processing in a peer-to-peer network. The routine 1000 may begin at block 1002, with the server 110 receiving a log-in request from one of the players of the system 50.

The log in request may be generated at the discretion of the player, according to the operation of the system 50, or as a combination of both. That is, according to one embodiment, the player may determine if or when he or she will log in to use the merchandising aspect of the system 50. According to another embodiment, a program or portion of a program operating in one or more of the gaming units 54, 74, 75, 94, the network computers 56, 76, 110, 112, or the personal communication devices 64, 84, 126 may determine if or when the player is logged in to use the merchandising aspect of the system 50. According to still another embodiment, a program or portion of a program operating in one or more of the gaming units 54, 74, 75, 94, the network computers 56, 76, 110, 112, or the personal communication devices 64, 84, 126 may determine if or when the player is permitted to log in to use the merchandising aspect of the system 50, the player then determining if and when to log in to the merchandising aspect.

In regard to the first embodiment, a "merchandising" button may be included along with the other buttons on the control panel 276, whether that control panel exists separate and apart from the display unit 274 or is represented by one or more images displayed on the display unit 274 and actuateable through the association of a touchscreen with the display unit 274. The player may depress the merchandising button whenever the player wishes to log in to the merchandising aspect of the system 50. Alternatively, the player may signal his or her desire to use the merchandising aspect of the system 50 by establishing a connection between a personal communication unit 64, 84, 126 associated with the player, the act of establishing the connection being related by the server 110 as reception of a log in request.

According to second embodiment, the log in request may be transmitted to the server 110 if a specific outcome is determined for a game being played at one of the gaming units 54, 74, 75, 94. For example, the specific outcome may be represented by an image of a specific combination of symbols that corresponds to a "winning" combination for which it is determined that a payout should be provided to the player, although the image could be of a specific combination of symbols that corresponds to a "losing" combination. As another alternative, the specific outcome may be a specific symbol appearing in any position, or in a particular position. The outcome may be as part of a primary game, as part of a secondary or bonus game, or as part of a tournament game, for example. When the outcome is determined, the player may be automatically logged in to the merchandising aspect of the system 50.

According to the third embodiment, the log in request may be transmitted to the server 110 if a specific outcome is determined and the player indicates that he or she wishes to use the merchandising aspect of the system 50. For example, after it is determined that a specific outcome has occurred, the display unit 274 may generate an image representative of an inquiry as to whether the player wishes to use the merchandising aspect of the system 50. The player may agree, or the player may not. For example, while the player is permitted to access the merchandising aspect of the system 50 only after specific outcomes are determined, upon accessing the merchandising aspect, the player's choices may be limited by the number of units of purchasing power that the player has when the merchandising aspect of the system 50 is accessed. Consequently, while the player may be permitted to access the system 50, the player may decide not to access the system 50 to permit him or herself the additional game play necessary to increase their supply of these purchasing power units.

After log-in, the routine 1000 may proceed to block 1004, where the server 110 may determine if the player that logged in at block 1002 has an associated profile. If it is determined that the player has an associated profile, then the routine may proceed to block 1006, where the server may retrieve the profile from its storage location, after which the method proceeds to block 1008. The routine may also proceed to block 1008 if it is determined that no profile is associated with the player.

A profile may refer to any collection of information or data that is identified, related or associated with the player. This profile may be stored in a file in a database accessible by the server 110, or it may be stored in the memory of the gaming unit 54, 74, 75, 94 or the personal communication unit 64, 84, 126 used by the player. As a still further alternative, the information may be stored on a player tracking card that may be disposed into the card reader 262 of the player tracking module 260. Further, the profile may include data or information stored remotely to the server 110, which data or information may still remain associated with and part of the profile.

According to one embodiment, the profile may include an identifier. The identifier may be unique to each player, like a cell phone number of the personal communication unit 64, 84, 126 used by the player to interface to the system 50, or may be unique to a group of players relative to the remainder of players registered with the system 50. For example, where the operator intends to distribute the personal communication units to members of a tour group, for example, the desired goal may not be for the merchandising aspect of the system 50 to respond differently to each member of the tour group, but rather for the merchandising aspect to respond to members of the tour group differently than to the general public. As another example, the gaming system operator may wish to target certain groups or categories of player, e.g., "high-rollers," to receive bonuses not available to the general public, but available to all the members of the target group. Consequently, the members of the target group may receive personal communication units with an identifier which differentiates the members of the group from the public-at-large and all other players carrying personal communication units. In this regard, some of the personal communication units may develop recognition as a status symbol item as well as performing a practical function.

Moreover, more than one identifier may be assigned to a profile, or stated slightly differently, one profile may be associated with more than one identifier. For example, a particular profile may be associated with a first identifier which indicates that the associated player belongs to a first group, e.g., the "high-roller" group, and with a second identifier which indicates that the associated player belongs to a second group, e.g., the "ultra high-roller" group, which may or may not be exclusive of the first group. Moreover, the second identifier may be unique relative to all other identifiers, such that the associated player may be differentiated from all other players.

The profile may also include one or more records that may contain data about the characteristics, habits and/or preferences of a player associated with the identifier. For example, the profile may include basic personal data that will be stored in a personal data record, including such data as the name, address, Social Security number, date of birth, nationality, language skills, and cultural preferences of the player. The personal data record may also contain important dates, such as birthdays, anniversaries, and other occasions. The profile may also include data regarding the player's favorite foods, shows, prizes, complementaries ("comps"), and the like, this data being stored in an entertainment record and/or a personal prize preferences record. The profile may also include the player's preferences regarding the look of the game displayed, or the types or levels of sensory outputs utilized during the game.

Such records may be created and/or updated manually. That is, the player may enter the data personally, through the use of one or more of the gaming units 54, 74, 75, 94 configured to permit such data entry or via the Internet from a remote location, through the use of a computer that may or may not be configured as a gaming unit, etc. (e.g., kiosk 88). As an alternative, the player may answer questions on a questionnaire, and an employee of the network or system operator may enter the data into the system 50.

Such records may also be created and/or updated by the system 50. For example, the system 50 may generate and maintain a bonus record including a running total of the value wagered by the player and bonuses awarded therefor, and this may be associated with the profile. This information may be obtained, for example, through the player tracking modules 260. Extending beyond the monitoring of gaming information, the system 50 may also keep track of information of a player's use of other aspects of an operator's property or properties. Further, the system 50 may generate some of this data by analyzing the movements of the player to restaurants, theaters, etc. This data may then be stored in the entertainment record. Where the player accesses the Internet through the use of the system 50 or where the player permits the operator to track his or her use of the Internet through other methods, the system 50 may establish other records reflecting Internet usage. For example, the system 50 may track the products or services (e.g., travel) purchased by the player over the Internet, % or the sites visited or searches run by the player while on the Internet, and store such information in an Internet usage record. As one such example, the system 50 may have relationships with third-parties Internet companies who, with the permission of the player, make the information available to the operator to permit prizes to be selected according to the player's Internet habits. Alternatively, this information may be provided to the operator, with the player's permission, in exchange for providing Internet access via one of the gaming units 54, 74, 75, 94 or personal communication units 64, 84, 126.

Not all information has to come from either the player or the system 50. For example, both the player and the system 50 may generate data about the player's gaming preferences (e.g., favorite casino games) to be stored in a gaming record. Similarly, both the player and the system (through data analysis) may generate data about the player's wagering preferences to be stored in a wagering record. This data may include whether the player prefers to always bet the maximum, to always bet the maximum on certain games, to always bet a certain amount on certain value games, etc.

It will be recognized that the determination at block 1004 and the retrieval of the profile at block 1006 are optional, and may be omitted. According to such an embodiment, the routine 1000 would proceed from log in at block 1002 to block 1008.

At block 1008, a display unit is controlled to generate an image. The image is representative of a plurality of available payouts. Each of the payouts represents either a good or a service. For example, the payout may be redeemed for a good or a service, or, in the alternative, may be a good or a service where that good or service is available electronically (for example, a computer game or a music file). Further, each payout may have a purchase cost associated therewith, the purchase cost representing the cost to the player to receive the good or the service.

In regard to the purchase cost of the payout, this purchase cost may be, but need not necessarily be, equal to the cost of the item as purchased by the casino operator from a third-party vendor, or to the cost of the item to the third-party vendor, if the third party vendor is, for example, sponsoring the merchandising aspect of the system 50, at least in part. Alternatively, the purchase cost may represent a cost that is less than the cost to the casino operator or third-party vendor, in which case the discount may be considered to be an additional payout or an enhancement of the payout to the player permitted to use the merchandising aspect of the system 50. As another alternative, the purchase cost may represent a cost that is more than the cost to the casino operator or third-party vendor, in which case the amount above the cost to the casino operator or third-party vendor may result in a further profit to the casino operator or third-party vendor.

Further, the purchase cost may be represented in a variety of units of purchasing power. For example, the purchase costs of the available payouts may be presented in terms of the units also used to purchase game play, referred to above as "credits" and redeemable for units of local currency in accordance with an exchange rate established, for example, by the casino operator. As one example, the casino operator may determine that for one of the gaming units 54, 74, 75, 94 the exchange rate is one dollar:one credit, and for another of the gaming units 54, 74, 75, 94 the exchange rate is one nickel:one credit. Alternatively, the purchase costs of the available payouts may be presented in terms of the local currency, which currency may have a direct relation to the number of credits presently associated with the gaming unit 54, 74, 75, 94 associated with the player or associated with the player in another fashion, for example, by a cashless gaming system. As a further alternative, another form of purchasing power may be provided to the player in response to, for example, game play, which purchasing power may be used by the player to acquire the available payouts. As one example, the player may receive units of purchasing power which are not redeemable for the local currency or useful in obtaining game play. Such units, which may be referred to as points, may only be useful in obtaining payouts from the merchandising system described herein.

The display unit on which the image is generated may be the display unit 274 according to an embodiment where the player accesses and uses the merchandising aspect of the system 50 via one of the gaming units 54, 74, 75, 94. Alternatively, the image may be generated on the display unit 264 associated with the player tracking module 260 (FIG. 3), although the sophistication of the presentation of the available payouts may be reduced as a consequence. The display unit may be associated with a kiosk, such as the kiosk 88. As a still further alternative, the display unit may be associated with one of the personal communication units 64, 84, 126.

According to one embodiment, the server 110 may cause the image to be generated using the software used to generate the images displayed during the operation of the apparatus, for example, the gaming unit 54, according to the gaming aspect of the system 50. The server 110 may do this by downloading a program to be executed by the controller 310, or by providing a data file that is used during the execution of a program already stored in the memory 316 of the controller 310, the data file causing an image to be generated according to the merchandising aspect of the system 50, rather than the gaming aspect of the system 50.

According to another embodiment, the image may be generated through the use of software commonly referred to as "browser" software, which software may be operating on one of the gaming units 54, 74, 75, 94, the kiosk 88 or the personal communication units 64, 84, 126. One example of browser software is the Internet Explorer program, sold by Microsoft Corp. of Redmond, Wash. The browser software may be used to obtain files from the server 110, or from other sources. The browser software may cause the image to be generated according to a file received from the server 110, the file containing information written, for example, in HyperText Markup Language (HTML). The file transmitted by the server 110 may have been retrieved from a memory storage location by the server 110, or the file transmitted by the server 110 may be output of a program that was retrieved from a memory storage location and then executed by the server 110.

As an example of the latter case, the server 110 may access a program referred to as a Common Gateway Interface (CGI) script, the output of which is provided to the browser in response to its request. In fact, where a profile is available for the player, one or more of the data 'records that make up' the profile may be passed to the CGI script to change the content of the output image according to the data or information known about the player using the merchandising aspect of the system 50. For example, according to the player's profile, certain payouts may be displayed as opposed to others—a steak dinner may not be included as a possible payout in an image shown to a vegetarian, or tickets to a rock-and-roll concert to a player who only enjoys classical music. As another alternative, data concerning the circumstances under which the player is accessing the merchandising aspect of the system 50 may be passed to the CGI script, which data may cause changes to the output image. For example, it may be desired that the image be different if, for example, the player has just scored a minor jackpot as opposed to a major jackpot or a progressive jackpot.

Other information may also be passed to the script about the casino operator (network operator) and the vendor or vendors providing the payouts for purchase, which may vary the content of the image provided to the player. For example, a casino and a first vendor may partner on a first merchandising program, and the casino and a second vendor may partner on a second merchandising program. Alternatively, a vendor may partner with a first casino on a first merchandising program, and a second casino on a second merchandising program. Rather than preparing a separate script for each of the possible combinations of casino and vendor, the script may be designed to receive information concerning the casino and/or vendor involved, and may modify the presentation of the dynamic file by accessing files, lists, records, databases, etc. associated with the casino and/or vendor whose information is passed to the script.

In similar fashion, the script may be passed other information that will cause the presentation of the image to be tailored to a specific combination of circumstances. As one such circumstance, certain payouts may be available only in certain geographic locations. For example, the operator or vendor may determine that the cost of providing a particular good or service to a particular geographic location is too expensive, or there might be governmental regulations that prohibit transportation of certain items (such as produce) to certain geographic locations (such as across national boundaries). As another circumstance, certain payouts may be available only at certain times of the year. As one example, a vendor of sporting goods may wish to offer golfing supplies during the summer months and skiing supplies during the winter months. As another alternative, the operator or the vendor may reduce the purchase cost of items during holiday seasons, during the period leading up to the holiday season, or even during the period after the holiday season is over. Consequently, such information may be input into the server 110 by the operator or the vendor, and used to modify the image presented to the player.

As another example of the use of such a dynamic file, data concerning the purchase cost may be passed to the CGI script, and used to adjust the images generated. For example, a gaming unit 54 used by a first player to access the merchandising aspect of the system 50 may have a conversion rate of one nickel:one credit, while a gaming unit 94 used by a second player to access the merchandising aspect of the system 50 may have a conversion rate of one dollar:one credit. When the server 110 retrieves the dynamic file for transmission of the image to the first player, the server may pass along a data file that indicates that the purchase costs displayed as part of the image must be calculated according to the one nickel:one dollar conversion rate. Similarly, the server 110 may pass a data file for the second player that indicates that the purchase, costs displayed as part of the image must be calculated according to one dollar:one credit. As such, a list, table, or database for the purchase costs for the available payouts may be kept in a form that eases the analysis of the purchase costs for those parties, such as employees of the casino operator, responsible for administering the merchandising aspect of the system 50, while permitting the purchasing costs to be presented to the player in accordance with the units of purchasing power that the player is currently using to otherwise purchase game play, which may ease comparison by the player.

As another example of the use of a dynamic file, a casino operator may wish to offer a common list, table or database of available payouts for a system 50 that includes players accessing the merchandising aspect of the system 50 in various geographically dispersed locations. Moreover, the available payouts, in the form of goods and services, may be acquired locally by the casino operator. Further, the cost of acquiring the payouts locally by the casino operator may vary from location to location, depending on, for example, local availability of the good or service offered or prevailing economic conditions (e.g., a high standard of living versus a lower standard of living). By using a dynamic file, the issue of differing costs to the casino operator may be resolved in a number of ways. A single database may be established and administered, which database contains information on all of the relevant localized conditions that may affect the cost of the available payouts to the casino operator. Further, at the time the server 110 accesses the dynamic file, information concerning the geographic location of the player accessing the merchandising aspect of the system 50 may be passed to the dynamic file, which then executes a search of the database for the relevant adjustments to be made to the image to reflect the local variations in cost to the casino operator. Alternatively, rather than maintaining a common database, the dynamic file may include formulae which receive parameters passed at the time the server 110 accesses the file, which parameters are specific to a specific geographic region, and permit the purchase costs to be calculated for inclusion in the image presented to the player contemporaneous with the accessing of the merchandising aspect by the player.

Other information may also be passed to the script to cause the purchase price to be modified. For instance, the network or system operator or the vendor may wish to discount items for a particular group of players relative to all other players. As one such example, the network or system operator or the vendor may wish to offer a discount to those players that are members of a player tracking club and that the player tracking club recognizes as "high-rollers" or "valued customers." The server 110 may retrieve such status information from an associated player tracking system (more particularly, an associated player tracking server) and pass that information along to the script. Rather than modifying the purchase cost for a particular group of players relative to all other players, the network or system operator or the vendor may modify the purchase cost for all players, but only for a limited period of time. For example, the purchase price may be modified according to timing considerations, such as seasonal variations. Alternatively, purchase costs may be modified according to other timing considerations, such as in the case of a promotional period, for example, to develop interest in the merchandising aspect of the system 50 or to develop interest in a particular good or service being offered. Other considerations are also possible.

At block 1010, the server 100 determines if a request has been received from the player to view other payouts. For example, after reviewing the image displayed initially at block 1008, the player may determine that he or she wishes to see additional payouts because he or she does not wish to select any of the payouts initially displayed. Such a request may be transmitted to and received by the server 110 as a consequence of the player depressing a button, such as a "See More" button, which button may be included on a control panel that is separate from the display unit 274 or that includes the display unit 274 and an associated touchscreen, for example. If the server 110 determines at block 1010 that a request has been received to view additional images, the routine 1000 returns to block 1008 and a new image is generated, the new image differing from the previous image in that at least one good or service is shown in the new image that was not part of the previous image.

If the determination is made at block 1010 that no request was received from the player to view additional payouts, then the routine proceeds to block 1012. At block 1012, a determination is made as to whether a selection of one of the payouts represented by the image displayed has been received from the player.

Given the number of manners in which the player may access the merchandising aspect of the system 50 and the number of manners in which the information about available payouts may be presented to the player, there are numerous manners in which a player may transmit and the server 110 receive the player's selection of one of the plurality of available payouts. As one example, the image may be displayed on the display unit 274 associated with one of the gaming units 54, 74, 75, 94, which gaming unit may also have a touchscreen associated therewith. According to such an example, the player may make his or her selection known by touching an area of the touchscreen generally associated with the image of the payout that he or she wishes to select. According to another example, the gaming unit 54, 74, 75, 94 may include a "Select Payout" button and a "Next Payout" button. By depressing the "Next Payout" button, the player may move a selection indicator from one available payout to the next until the selection indicator is associated with the payout the player wishes to select, at which time the player may then depress the "Select Payout" button to select the payout. According to a still further example, the image may include, in addition to the representations of the available payouts and their purchase costs, an identifier for each of the available payouts, which identifier may include a number, a letter or an alpha-numerical combination. A keypad including the numbers and/or letters used in the identifiers for the payouts may also be provided, and the player may select one of the available payouts by depressing the numbers and/or letters on the keypad associated with the payout he or she wishes to select.

If the determination is made at block 1012 that a selection has been made, then the routine 1000 proceeds to block 1014, wherein the purchase cost of the payout selected is received from the player. For example, the server 110 may instruction the gaming unit 54, 74, 75, 94 to decrease the number of credits associated with the gaming unit and the player making the selection in an amount equal to the purchase cost of the item selected. The credits may then be transferred to an account maintained for such transfers by the casino operator where the casino operator administers the distribution of the payout selected, or the credits may be transferred to an account maintained either locally or remotely for such transfers by a third-party vendor where the third-party vendor administers the distribution of the payout selected. As an alternative, where the third-party vendor administers the distribution of the payout, the casino operator may transfer the credits received from the player in association with a selection into an account established for the third-party vendor locally at the time the selection is made, and may then transfer the credits from the local account to a remote vendor account according to a criterion, such as when the balance of the account reaches a certain limit or at certain times of the day, week or month. If the player has additional credits remaining after the server decreases the player's credit balance, then the additional credits may be used by the player for game play or may be distributed to the player when the player cashes out. Alternatively, where the purchase cost of the selected payout exceeds the credit balance established at the gaming unit 54, 74, 75, 94, the player may be informed that the transaction cannot be completed or the player may be permitted to input additional value into the gaming unit 54, 74, 75, 94 such that the credit balance meets or exceeds the purchase cost of the selected payout.

After the purchase cost is received from the player at block 1014, the routine 1000 proceeds to block 1016. At block 1016, the server 110 transmits a request to provide the player with the one of the plurality of payouts selected by the player. Where the casino operator also administers the distribution of the payouts, the request may take the form of an electronic or hard copy request that is forwarded internally to the appropriate casino operator employees responsible for transmitting the payout to the player. For example, where the casino operator has a property that includes a casino, a hotel, and a leather goods store, when a player selects a leather jacket using the merchandising aspect of the system 50, the casino operator may electronically transmit a request to the leather goods store to remove the leather jacket from their selection and a request to the concierge at the hotel to have a bellhop go to the leather goods store, pick up the jacket, and deliver the jacket to the player's room. Alternatively, where a third-party vendor administers the distribution of the payouts, the request may take the form of an invoice that is transmitted electronically to the third-party vendor. As a further alternative, where the third-party vendor administers the merchandising aspect of the system 50 and the distribution of the payouts, the request may transmitted internally at the third-party vendor's place of business.

If the determination is made at block 1012 that no selection has been received from the player or after the server 110 transmits a request to provide the player with the selected payout at block 1016, the routine 1000 proceeds to block 1018 and the server 110 determines if the player's use of the merchandising aspect of the system 50 is complete. If the player has not completed his or her use of the merchandising aspect of the system 50 (for example, if the player wishes to select other payouts), the routine 1000 returns to block 1008. If the determination is made that the player has completed his or her use of the merchandising aspect, the routine 1000 exits.

The following is an example of the operation of the merchandising aspect of the system 50 according to an embodiment of the system 50. This example is for illustration purposes only, and is not meant to limit the scope of the claims thereby, or to emphasize one embodiment discussed over another.

According to this example, the player is playing a poker game at one of the gaming units 75 associated with the network 72. The player also has a personal communication unit 84, the personal communication unit 84 coupled to the transceiver 82 via an infrared data link 86.

The merchandising aspect of the system 50 is administered by the casino operator via the network computer 110, which network computer 110 operates as a merchandising server. The server 110 provides the player with access to the merchandising aspect of the system 50 in response to receipt of a request from the player, which request comes from the personal communication unit 84 associated with the player. The merchandising aspect does not include use of a profile for the player. The purchase costs of payouts are shown in terms of credits. The distribution of the payouts selected is handled by the casino operator.

Over a series of games, the player accumulates a number of credits, the credits being provided to the player, for example, in response to winning combinations, or hands, in the poker game. The player may also have received credits as a consequence of a bonus game. Eventually, the player determines that she has sufficient credits such that the player wishes to access the merchandising aspect of the system 50 to acquire one or more payouts in the form of goods and/or services.

At block 1002, the player uses her personal communication unit 84 to transmit a request, via the data link 86, transceiver 82, communications computer 80 network 102 and data links 78, 106, 114 to the merchandising server 110 to log in. The merchandising server 110 receives the log in request, and the routine 1000 proceeds to block 1008 as the system according to this example does not use player profiles.

Figure 18:
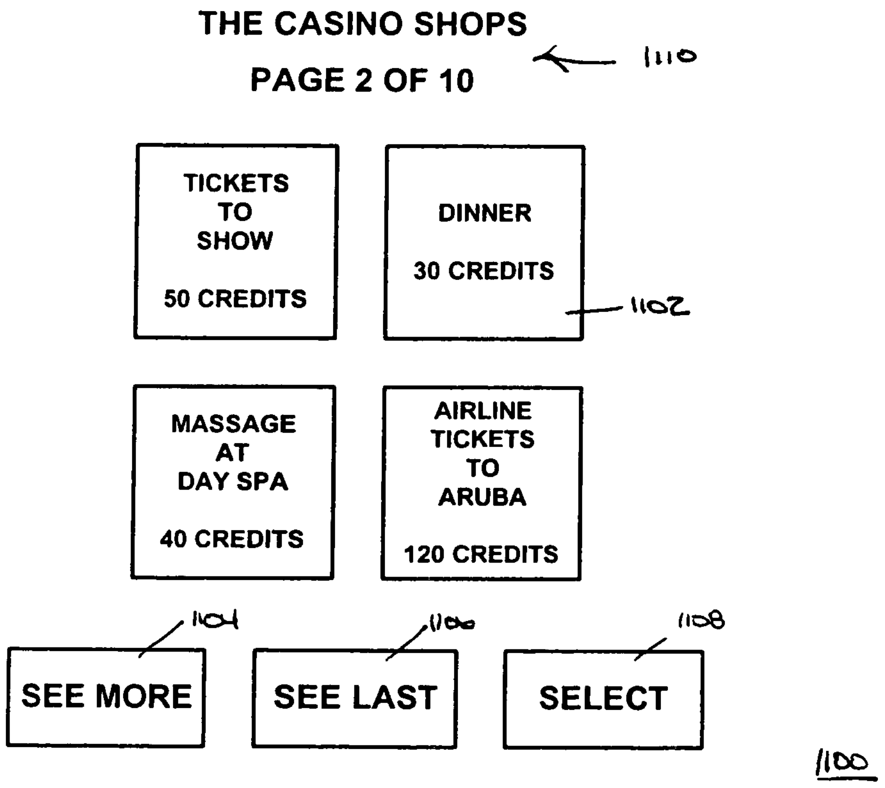
FIG. 18 is an illustration of an embodiment of a visual display that may be displayed during performance of the merchandising routine of FIG. 17.

At block 1008, the server 110 retrieves an image (such as image 1100 shown in FIG. 18) and transmits the image to the personal communication unit 84, which may be personal digital assistant (PDA), to be displayed on an associated display unit. The image 1100 may include four images 1102, each image 1102 representing a payout and its associated purchase cost. The images 1102 may include textual and pictorial information or data; as illustrated, the images 1102 include only textual information or data. The images 1102 are arranged in a two-by-two matrix format, although that arrangement may vary. In fact, a single image 1102 may be shown on each image 1100. As illustrated, the available payouts may include tickets to a show, a coupon for a dinner, a massage at a day spa associated with the casino property where the gaming unit 75 is located, and airline tickets to Aruba. Also displayed on the image is a "See More" button 1104, a "See Last" button 1106 and a "Select" button 1108. The player may use the "See More" and "See Last" buttons 1104 and 1106 to navigate the images 1100 (which are referred to as pages in accompanying header information 1110) by striking a touchscreen associated with the display unit with a stylus that is associated with the personal communication unit 84. Similarly, the player may use the stylus associated with the personal communication unit 84 to touch the image 1102 associated with the desired payout and then the "Select" button 1108.

In response to signals transmitted by the personal communication unit 84 and received by the server 110, the server 110 determines at block 1010 that the player does not desire to see additional available payouts. Further, the server 110 determines at block 1012 that the player has selected one of the payouts, the massage. The server 110 deducts the number of credits associated with the purchase cost of the massage from the credit balance maintained on the gaming unit 75 at block 1014. The server 110 also signals the ticket printer 256 associated with the gaming unit 75 to print a ticket which may be redeemed at the day spa for the massage. The server 110 then proceeds to block 1018, wherein the server 110 determines if the player has completed her use of the merchandising aspect of the system 50. According to the present example, the server 110 determines at block 1018 that the player has signaled that she wishes to complete her use of the merchandising aspect of the system 50 (for example, by terminating the data link 86 between the personal communication unit 84 and the transceiver 82), and the routine 1000 exits relative to the player.

What is claimed is:

1. A method of operating a gaming device, the method comprising:

receiving a wager from a player in terms of one or more gaming credits for a play of a game;

displaying an image representative of the play of the game;

randomly determining if a designated winning outcome from a plurality of different winning outcomes occurs in association with the play of the game; and if the determination is the designated winning outcome occurs in association with the play of the game:

(i) thereafter, determining a monetary purchase cost for each payout in a plurality of different payouts based on information stored on at least one memory device and based on at least one parameter received upon determination of the designated winning outcome, wherein the at least one parameter is selected from the group consisting of at least one geographic location of the player, a geographic location of a casino, a current time of the year, and a current season of the year, wherein said determination of the monetary purchase cost for each payout is also determined based on a status of the player, the status of the player being determined from a plurality of different statuses according to a player tracking system that tracks wagering activity of the player;

(ii) thereafter, displaying an image representing the plurality of payouts, the image including the monetary purchase cost for each payout in the plurality of payouts; and (iii) thereafter, if a selection from the player of one of the plurality of payouts is received, (a) receiving from the player the monetary purchase cost of the one of the plurality of payouts selected by the player; and (b) transmitting a request to provide the selected one of the plurality of payouts to the player;

and if a selection from the player of one of the payouts is not received, providing at least one monetary award to the player in terms of one or more credits, the at least one monetary award based, at least in part, on the wager received from the player and the determined designated winning outcome.

2. The method according to claim 1, which includes for each payout, determining the monetary purchase cost for said payout according to a conversion rate between a currency and the gaming credit.

3. The method according to claim 1, which includes for each payout, determining the monetary purchase cost for said payout according to further information regarding at least one of the player, a casino operator, and a vendor.

4. The method according to claim 1, which includes, if a determination is the designated winning outcome occurs in association with the play of the game, selecting the plurality of different payouts from a larger set of possible payouts.

5. The method according to claim 1, which includes selecting the plurality of payouts from a set of payouts according to at least one of further information regarding the player, a casino operator, and a vendor.

6. The method according to claim 1, which includes, if a selection from the player of one of the plurality of payouts is received, receiving less than the monetary purchase cost of the one of the plurality of payouts selected by the player according to the designated winning outcome occurring in association with the play of the game; and receiving the remainder of the monetary purchase cost of the one of the plurality of payouts selected by the player by receiving additional credits inputted by the player.

7. The method according to claim 1, which includes, if a selection from the player of one of the plurality of payouts is received, receiving more than the monetary purchase cost of the one of the plurality of payouts selected by the player according to the designated outcome occurring in association with the play of the game; and providing an amount in excess of the monetary purchase cost of the one of the plurality of payouts selected by the player to the player.

8. The method according to claim 1, which includes retrieving the image representing a plurality of payouts from a third-party vendor.

9. The method according to claim 8, which includes transmitting a request to a third-party vendor to provide the one of the plurality of payouts to the player.

10. A gaming system comprising:

a gaming apparatus including:

a value input device;

a display unit; and a controller having a processor and a memory operatively coupled to the processor, the controller operatively coupled to the value input device and the display unit, the controller being programmed to:

(a) receive a wager from a player in terms of one or more gaming credits for a play of a game; and (b) cause the display unit to generate an image representative of the play of the game; and a merchandising computer having a processor and memory operatively coupled to the processor, the merchandising computer being programmed to:

(a) randomly determine if a designated winning outcome from a plurality of different outcomes occurs in association with the play of the game;

(b) if the determination is the designated winning outcome occurs in association with the play of the game:

(i) thereafter, determine a monetary purchase cost for each payout in a plurality of different payouts based on information stored on at least one memory device and based on at least one parameter received upon determination of the designated winning outcome, wherein the at least one parameter is selected from the group consisting of at least one geographic location of the player, a geographic location of a casino, a current time of the year, and a current season of the year, wherein said determination of the monetary purchase cost for each payout is also determined based on a status of the player, the status of the player being determined from a plurality of different statuses according to a player tracking system that tracks wagering activity by the player;

(ii) thereafter, cause the display unit to generate an image representing the plurality of payouts, the image including the monetary purchase cost for each payout in the plurality of payouts;

(iii) thereafter, if a selection from the player of one of the plurality of payouts is received;

(1) receive from the player the monetary purchase cost of the one of the plurality of payouts selected by the player; and (2) transmit a request to provide the selected one of the plurality of payouts to the player;

and if a selection from the player of one of the plurality of payouts is not received, provide at least one monetary award to the player in terms of one or more credits, the monetary award based, at least in part, on the wager received form the player and the determined designated winning outcome.

11. The gaming system according to claim 10, wherein: if the merchandising computer determines the designated winning outcome occurs in association with the play of the game, the merchandising computer is programmed to determine a monetary purchase cost for each payout in the plurality of payouts, wherein for each payout, said determination of the monetary purchase cost for said payout is determined according to a conversion rate between a currency and the gaming credit.

12. The gaming system according to claim 10, wherein:

if the merchandising computer determines the designated winning outcome occurs in association with the play of the game, the merchandising computer is programmed to determine a monetary purchase cost for each payout in the plurality of payouts, wherein for each payout, said determination of the monetary purchase cost for said payout is determined according to further information regarding at least one of the player, a casino operator, and a vendor.

13. The gaming system according to claim 10, wherein:

if the merchandising computer determines the designated winning outcome occurs in association with the play of the game, the merchandising computer is programmed to select the plurality of different payouts from a larger set of possible payouts.

14. The gaming system according to claim 10, wherein:

the merchandising computer is programmed to select the plurality of payouts from a set of payouts according to at least one of further information regarding the player, a casino operator, and a vendor.

15. The gaming system according to claim 13, wherein:

the merchandising computer is programmed to select the plurality of payouts from a set of payouts according to information regarding a current time of the year.

16. The gaming system according to claim 15, wherein:

the merchandising computer is programmed to select the plurality of payouts from a set of payouts according to a seasonal variation.

17. The gaming system according to claim 10, wherein:

if a selection from the player of one of the plurality of payouts is received, the merchandising computer is programmed to:

(a) receive less than the monetary purchase cost of the one of the plurality of payouts selected by the player according to the designated winning outcome occurring in association with the play of the game; and (b) receive the remainder of the monetary purchase cost of the one of the plurality of payouts selected by the player by receiving additional credits inputted by the player.

18. The gaming system according to claim 10, wherein:

if a selection from the player of one of the plurality of payouts is received, the merchandising computer is programmed to:

(a) receive more than the monetary purchase cost of the one of the plurality of payouts selected by the player according to the designated winning outcome occurring in association with the play of the game; and (b) provide an amount in excess of the monetary purchase cost of the one of the plurality of payouts selected by the player to the player.

19. The gaming system according to claim 10, wherein:

the merchandising computer is programmed to retrieve the image representing a plurality of payouts from a third-party vendor.

20. The gaming system according to claim 19, wherein:

the merchandising computer is programmed to transmit a request to a third-party vendor to provide the one of the plurality of payouts to the player.

21. The gaming system according to claim 10, wherein the merchandising computer comprises a server.

* * * * *